United States Patent
Ihara

(10) Patent No.: US 11,289,099 B2
(45) Date of Patent: Mar. 29, 2022

(54) INFORMATION PROCESSING DEVICE AND INFORMATION PROCESSING METHOD FOR DETERMINING A USER TYPE BASED ON PERFORMED SPEECH

(71) Applicant: SONY CORPORATION, Tokyo (JP)

(72) Inventor: Keigo Ihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 75 days.

(21) Appl. No.: 16/330,131

(22) PCT Filed: Aug. 4, 2017

(86) PCT No.: PCT/JP2017/028471
§ 371 (c)(1),
(2) Date: Mar. 4, 2019

(87) PCT Pub. No.: WO2018/087967
PCT Pub. Date: May 17, 2018

(65) Prior Publication Data
US 2019/0214023 A1 Jul. 11, 2019

(30) Foreign Application Priority Data
Nov. 8, 2016 (JP) .............................. JP2016-218130

(51) Int. Cl.
*G10L 17/22* (2013.01)
*G10L 17/06* (2013.01)
(Continued)

(52) U.S. Cl.
CPC .............. *G10L 17/22* (2013.01); *G06Q 30/06* (2013.01); *G10L 15/10* (2013.01); *G10L 17/00* (2013.01);
(Continued)

(58) Field of Classification Search
CPC ........................................................ G10L 17/22
See application file for complete search history.

(56) References Cited

U.S. PATENT DOCUMENTS 6,058,364 A * 5/2000 Goldberg ................ G10L 15/22
704/240
9,691,379 B1 * 6/2017 Mathias .............. G10L 15/1815
(Continued)

FOREIGN PATENT DOCUMENTS

CN 105448292 A 3/2016
CN 105868360 A 8/2016
(Continued)

OTHER PUBLICATIONS

Extended European Search Report dated Sep. 16, 2019 in European Patent Application No. 17870181.9, 8 pages.
(Continued)

*Primary Examiner* — Shaun Roberts
(74) *Attorney, Agent, or Firm* — Oblon, McClelland, Maier & Neustadt, L.L.P.

(57) ABSTRACT

An information processing device including processing circuitry is provided. The processing circuitry configured to receive voice information regarding a voice of a user collected by a specific microphone of a plurality of microphones. The processing circuitry is configured to determine the user identified on a basis of the voice information regarding the voice of the user collected by the specific microphone among the plurality of microphones to be a specific type of user that has performed speech a predefined number of times or more within at least a certain period of time. Further, the processing circuitry is configured to control a message to be output to the user via a speaker corresponding to the specific microphone based on the user being determined to be the specific type of user.

20 Claims, 26 Drawing Sheets

(51) Int. Cl.
*H04R 3/00* (2006.01)
*H04R 1/40* (2006.01)
*G10L 17/00* (2013.01)
*G06Q 30/06* (2012.01)
*G10L 15/10* (2006.01)
*G06Q 30/02* (2012.01)

(52) U.S. Cl.
CPC .............. *G10L 17/06* (2013.01); *H04R 1/406* (2013.01); *H04R 3/005* (2013.01); *G06Q 30/02* (2013.01)

(56) References Cited

U.S. PATENT DOCUMENTS

| | | | |
|---|---|---|---|
| 9,898,250 B1* | 2/2018 | Williams | G06F 3/165 |
| 2002/0156626 A1* | 10/2002 | Hutchison | G10L 15/16 |
| | | | 704/231 |
| 2005/0043994 A1* | 2/2005 | Walker | G06Q 10/087 |
| | | | 705/14.19 |
| 2007/0156470 A1* | 7/2007 | Granucci | G06Q 10/087 |
| | | | 705/5 |
| 2009/0157472 A1* | 6/2009 | Burazin | G06Q 30/0259 |
| | | | 705/14.57 |
| 2012/0072290 A1* | 3/2012 | Leung | G06Q 30/0269 |
| | | | 705/14.66 |
| 2013/0006633 A1* | 1/2013 | Grokop | G06N 7/005 |
| | | | 704/245 |
| 2013/0197912 A1 | 8/2013 | Hayakawa | |
| 2013/0218641 A1* | 8/2013 | Graham | G06Q 40/02 |
| | | | 705/7.33 |
| 2015/0324881 A1 | 11/2015 | Ouimet | |
| 2015/0356980 A1* | 12/2015 | Sako | G10L 21/0208 |
| | | | 704/226 |
| 2017/0133011 A1* | 5/2017 | Chen | G10L 15/30 |
| 2018/0150851 A1 | 5/2018 | Ouimet | |

FOREIGN PATENT DOCUMENTS

| | | |
|---|---|---|
| JP | 2001-300099 A | 10/2001 |
| JP | 2004-46233 A | 2/2004 |
| JP | 2009-145755 A | 7/2009 |
| JP | 2010-156825 A | 7/2010 |
| JP | 2011-43715 A | 3/2011 |
| JP | 2013-164642 A | 8/2013 |
| JP | 2014-13494 A | 1/2014 |
| JP | 3190554 U | 5/2014 |
| WO | WO-2008111190 A1 | 9/2008 |

OTHER PUBLICATIONS

International Search Report dated Oct. 31, 2017 in PCT/JP2017/028471 filed Aug. 4, 2017.

\* cited by examiner

FIG. 5

| APPLICATION SERVICE ID | APPLICATION NAME | PREMIUM USER DETERMINATION CONDITION |
|---|---|---|
| app0001 | ABC SHOP STREET VALUED CUSTOMER CAMPAIGN | · CASE WHERE USER HAS ORDERED (PRONOUNCED) "BEEF JERKY" TEN TIMES WITHIN ONE MONTH<br>· CASE WHERE USER HAS ORDERED (PRONOUNCED) "STEAK MEAT" FIVE TIMES WITHIN ONE MONTH |
| app0002 | DD MALL VISIT THANKS EVENT | CASE WHERE USER HAS VISITED SHOP (PRONOUNCED SOMETHING IN SHOP) FIVE DAYS WITHIN ONE WEEK |
| app0003 | EE SHOPPING CENTER MALE PREMIUM USER PRIVILEGE | CASE WHERE USER HAS VISITED SHOP (PRONOUNCED SOMETHING IN SHOP) FIVE DAYS WITHIN ONE WEEK, IS MALE ADULT, AND HAS PRONOUNCED SPECIFIC KEYWORD "IT IS HOT" |
| ... | ... | ... |

APPLICATION SERVICE MANAGEMENT TABLE

FIG. 6

| APPLICATION SERVICE ID | | app0001 |
|---|---|---|
| KEYWORD#1 | KEYWORD ID | kw0001 |
| | KEYWORD | BEEF JERKY |
| KEYWORD#2 | KEYWORD ID | kw0002 |
| | KEYWORD | STEAK MEAT |
| ... | ... | ... |

APPLICATION SERVICE KEYWORD LIST

FIG. 7

| APPLICATION SERVICE ID | | app0001 |
|---|---|---|
| TERMINAL#1 | TERMINAL ID | dev0001 |
| TERMINAL#2 | TERMINAL ID | dev0002 |
| ... | ... | ... |

APPLICATION SERVICE TERMINAL LIST

FIG. 8

| USER ID | VOICEPRINT DATA | APPLICATION SERVICE DATA | |
|---|---|---|---|
| user0001 | xxxxxxxxxxxxxxxxxxxxxxxx xxxxxxxxxxxxxxxxxxxxxxxx xxxxxxxxxxxxxxxxxx | #001 | APPLICATION SERVICE ID | app0001 |
| | | | APPLICATION DATA | wwwwwwww |
| | | #002 | APPLICATION SERVICE ID | app0002 |
| | | | APPLICATION DATA | zzzzzzzzzz |
| | | ... | ... | |
| user0002 | yyyyyyyyyyyyyyyyyyyyyyyy yyyyyyyyyyyyyyyyyyyyyyyy yyyyyyyyyyyyyyyyyy | #001 | APPLICATION SERVICE ID | app0005 |
| | | | APPLICATION DATA | mmmmmmmm |
| | | #002 | APPLICATION SERVICE ID | app0013 |
| | | | APPLICATION DATA | nnnnnnnnnn |
| | | ... | ... | |
| ... | | | | |

USER MANAGEMENT TABLE

FIG. 9

|  | USER ID | user0001 |
|---|---|---|
| KEYWORD#1 | APPLICATION SERVICE ID | app0001 |
|  | KEYWORD ID | kw0002 |
|  | TIME AND DATE OF REGISTRATION | 2016-02-25  16:35:04 |
| KEYWORD#2 | APPLICATION SERVICE ID | app0001 |
|  | KEYWORD ID | kw0002 |
|  | TIME AND DATE OF REGISTRATION | 2016-02-25  17:01:23 |
| ... | ... | ... |

USER KEYWORD HISTORY

FIG. 10

|  | USER ID | user0001 |
|---|---|---|
| TERMINAL#1 | TERMINAL ID | dev0111 |
|  | TIME AND DATE OF REGISTRATION | 2016-03-02  13:23:29 |
| TERMINAL#2 | TERMINAL ID | dev0112 |
|  | TIME AND DATE OF REGISTRATION | 2016-03-02  13:25:40 |
| ... | ... | ... |

USER IDENTIFICATION HISTORY

FIG. 20
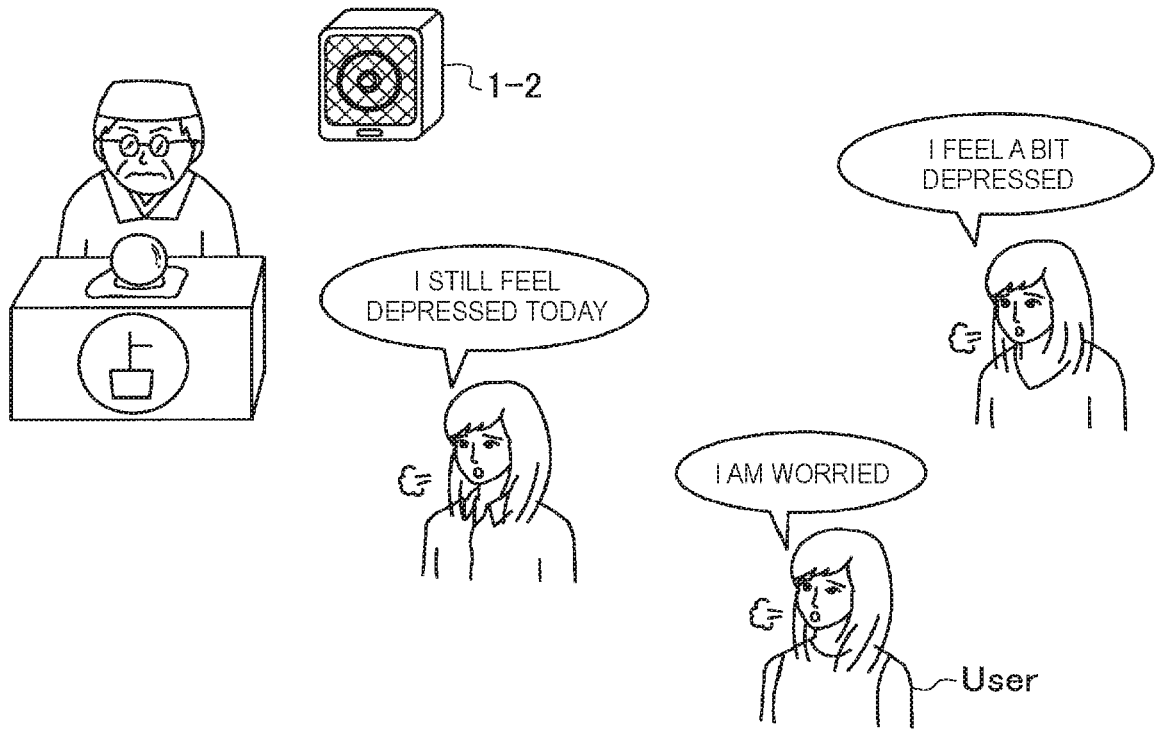
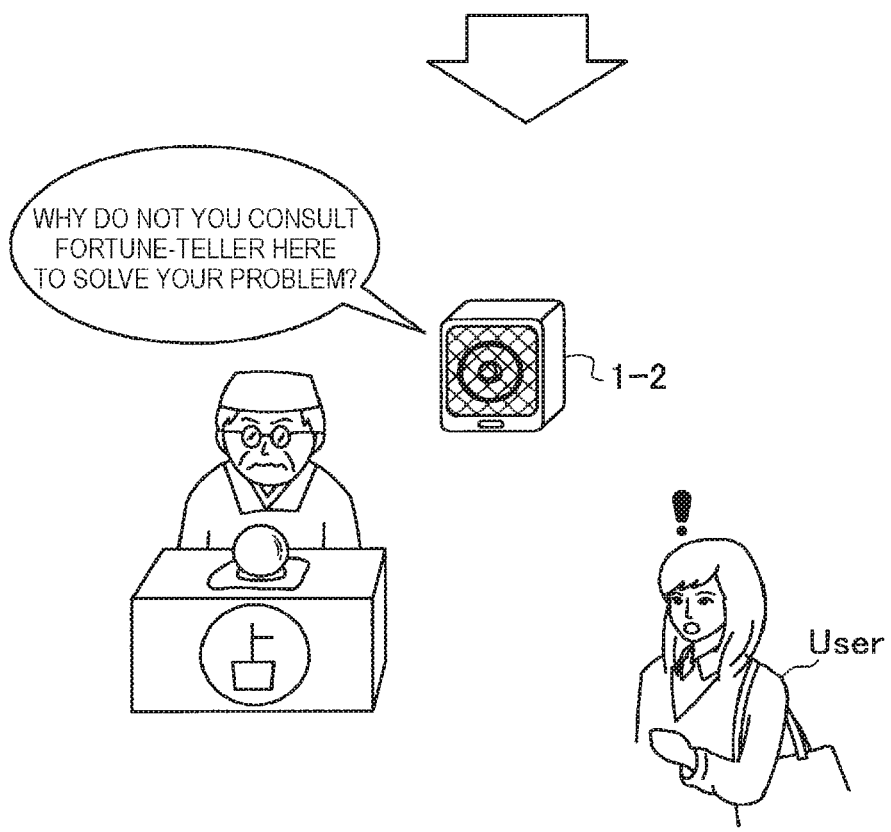

FIG. 24
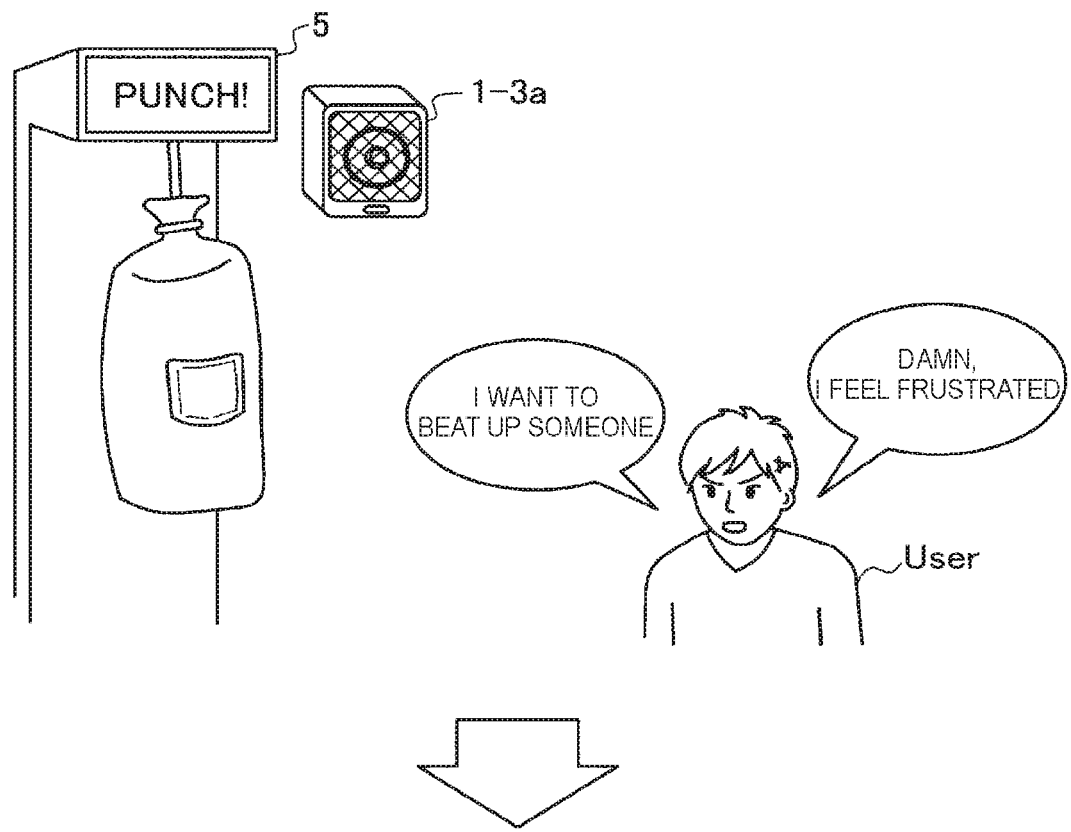
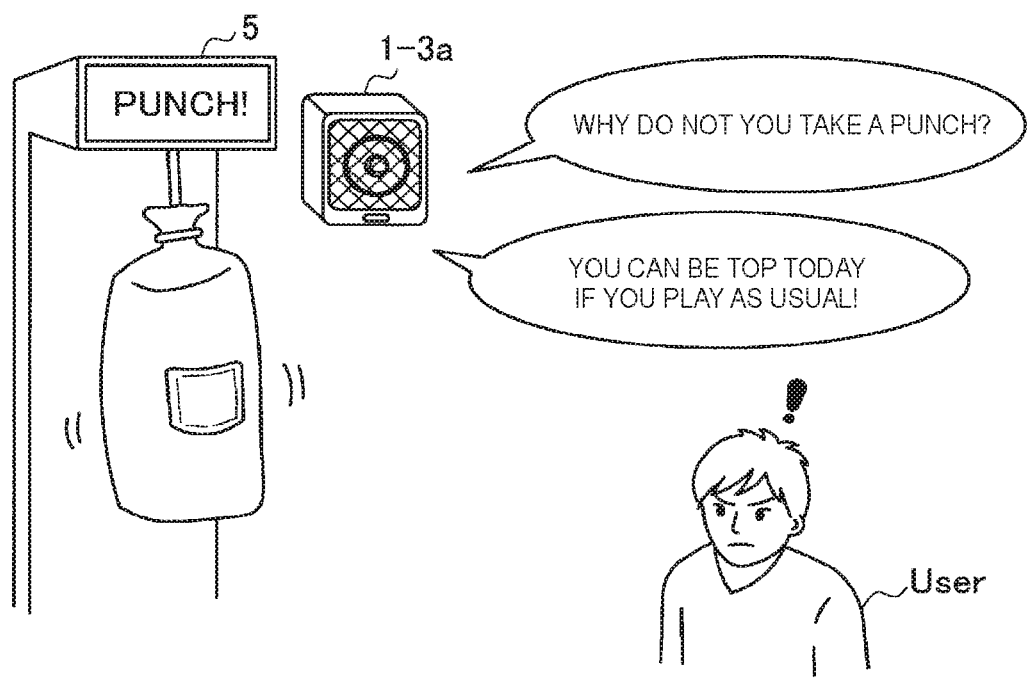

INFORMATION PROCESSING DEVICE AND INFORMATION PROCESSING METHOD FOR DETERMINING A USER TYPE BASED ON PERFORMED SPEECH

TECHNICAL FIELD

The present disclosure relates to an information processing device and an information processing method.

BACKGROUND ART

Conventionally, there exists a service of measuring visit frequency of a user using a positioning technology by an application activated in a smartphone or the like, and providing the user with a visit point, good deal information, and the like.

Here, regarding an identification technology of a client, for example, Patent Literature 1 described below discloses an online karaoke system that extracts pre-registered personal information from a client database and identifies a client, on the basis of voice feature data generated by analyzing singing voice of karaoke, and outputs an allocated message.

In addition, Patent Literature 2 described below discloses an online karaoke system that reads a client ID from an ID card and outputs a message for a client on the basis of an analysis result of content of a corresponding client-based record.

In addition, Patent Literature 3 described below discloses a client management device that reads client information from a client recording medium such as a point card, calculates a visit rate of a client from the number of times the client has visited a recreation hall, and the number of business days of the recreation hall, accurately determines whether the client is a regular customer or a nonregular customer, and utilizes the determination result for business strategy of the recreation hall.

CITATION LIST

Patent Literature

Patent Literature 1: JP 2011-43715A
Patent Literature 2: JP 2004-46233A
Patent Literature 3: JP 2001-300099A

DISCLOSURE OF INVENTION

Technical Problem

Nevertheless, in all of the above-described technologies, it is necessary to pre-register client information, but users are hesitant to register personal information. In addition, for receiving a service, the user needs to present an ID card or a point card when the user visits a shop, which is bothersome.

In addition, a system requiring the use of a smartphone and an application has such a problem that elderly people who are unaccustomed to the use of devices cannot use the system.

In view of the foregoing, the present disclosure proposes an information processing device and an information processing method that can collect speech voice of a user, and recognize a specific user on the basis of the number of speeches performed by the user within a predetermined period.

Solution to Problem

According to the present disclosure, there is proposed an information processing device including: a communication unit capable of receiving voice information regarding voice collected by a plurality of microphones disposed discretely; and a control unit configured to determine a user identified on the basis of voice information regarding voice collected by a specific microphone among the plurality of microphones, the voice information having been received via the communication unit, to be a specific user that has performed speech a predefined number of times or more within at least a certain period of time, and control voice information to be transmitted to the specific user, to be transmitted to a speaker corresponding to the specific microphone, via the communication unit.

According to the present disclosure, there is proposed an information processing method including: by a processor, determining a user identified on the basis of voice information regarding voice collected by a specific microphone among a plurality of microphones disposed discretely, the voice information having been received via a communication unit capable of receiving voice information regarding voice collected by the plurality of microphones, to be a specific user that has performed speech a predefined number of times or more within at least a certain period of time; and controlling voice information to be transmitted to the specific user, to be transmitted to a speaker corresponding to the specific microphone, via the communication unit.

Advantageous Effects of Invention

As described above, according to the present disclosure, it becomes possible to collect speech voice of a user, and recognize a specific user on the basis of the number of speeches performed by the user within a predetermined period.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of an application service management table according to the present embodiment.

FIG. 6 is a diagram illustrating an example of an application service keyword list according to the present embodiment.

FIG. 7 is a diagram illustrating an example of an application service terminal list according to the present embodiment.

FIG. 8 is a diagram illustrating an example of a user management table according to the present embodiment.

FIG. 9 is a diagram illustrating an example of a user keyword history according to the present embodiment.

FIG. 10 is a diagram illustrating an example of a user identification history according to the present embodiment.

FIG. 20 is a diagram describing an application example of the second embodiment.

FIG. 24 is a diagram describing an overview of Application Example 1 of the third embodiment.

MODE(S) FOR CARRYING OUT THE INVENTION

Figure 1:
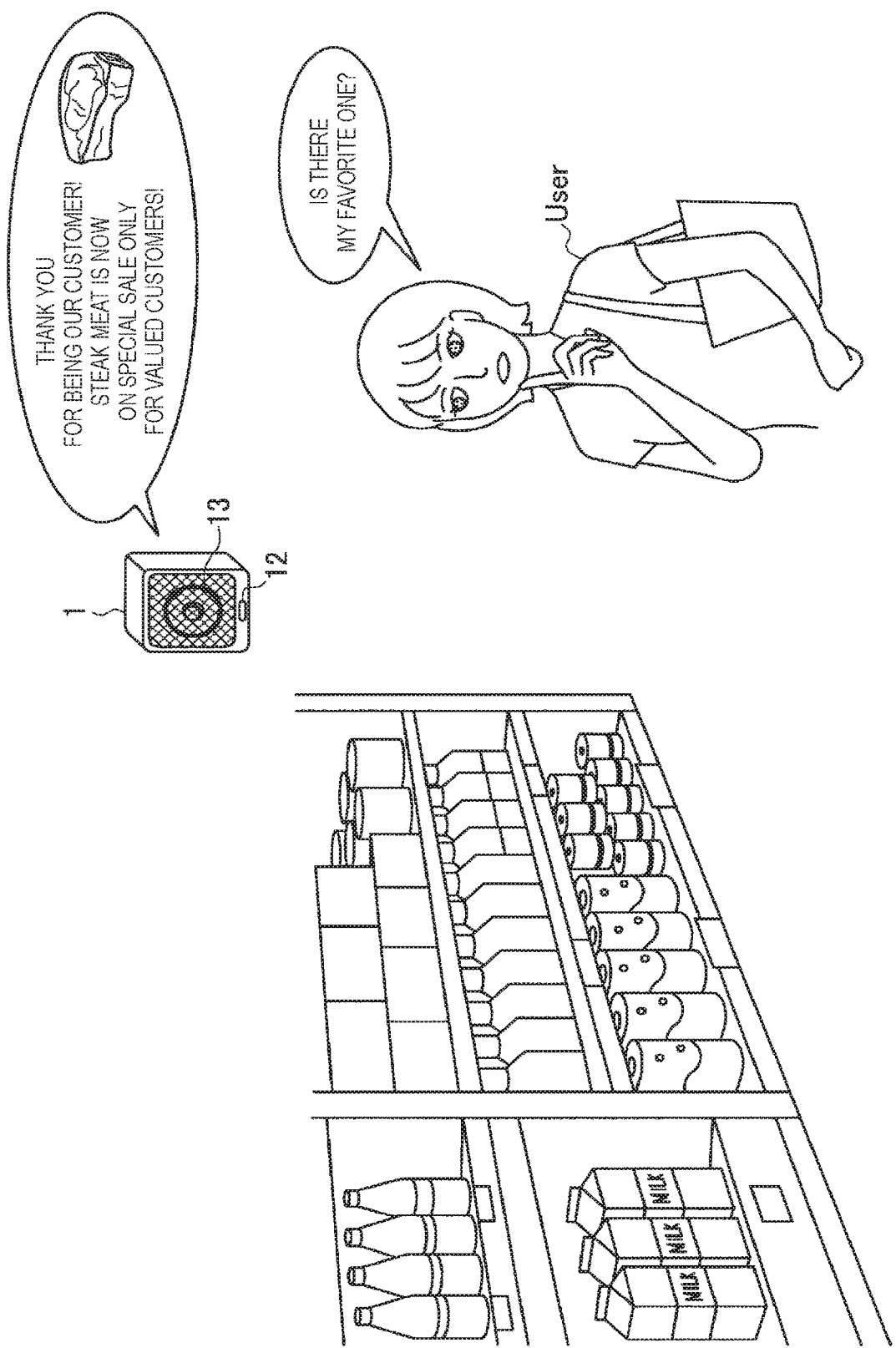
FIG. 1 is a diagram describing an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be given in the following order.

1. Overview of Information Processing System According to Embodiment of Present Disclosure 2. Configuration
2-1. Configuration of Terminal Device 1
2-2. Configuration of Server 2
3. Operation Process
3-1. Registration Process
3-2. Response Process
4. Embodiments
4-1. First Embodiment
4-2. Second Embodiment
4-3. Third Embodiment
 (4-3-1. Application Example 1)
 (4-3-2. Application Example 2)
5. Conclusion 1. Overview of Information Processing System According to Embodiment of Present Disclosure FIG. 1 is a diagram describing an overview of an information processing system according to an embodiment of the present disclosure. As illustrated in FIG. 1, the information processing system according to the present embodiment collects speech voice of a user by a terminal device 1 having input and output functions of voice, and outputs predetermined response voice to a user determined to be a specific user satisfying a predetermined condition.

Specifically, for example, voice of a user who has murmured "is there my favorite one?" in a store is collected by a voice input unit 12 (microphone) of the terminal device 1 installed in the store, identification of the user is performed by analyzing a voiceprint of voice information of the user, and whether the user is a regular customer or not (e.g. whether voice recognition of the user identified on the basis of voiceprint analysis has been performed in the store a predetermined number of days within a predetermined period or not) is determined. Then, in a case where the user satisfies a determination condition, the user is determined to be a regular customer, and a special response for regular customers (e.g. "special sale of steak meat limited to valued customers", etc.) is output as voice from a voice output unit 13 (speaker) of the terminal device 1 as illustrated in FIG. 1.

In this manner, in the present embodiment, because solid identification is performed by analysis of speech voice, there is no need to pre-register personal information such as a name and an address of a user, and in addition, it becomes possible to perform determination of a regular customer without presenting an ID card, a point card, or the like. In addition, an ID card, a point card, or the like is normally created at the time of a purchase action in a store, but in the case of performing solid identification on the basis of voice as in the present embodiment, a previous purchase action is not always needed. In addition, speech voice of a user can be collected when the user makes conversation with a store staff or another customer, makes a greeting, mutters to oneself, murmurs, makes conversation with a voice agent in a store, or the like. In addition, such an effect that clients (users) are psychologically less hesitant about individual identification that is based on speech voice, as compared with face recognition in which their faces are imaged by a camera can also be caused.

Figure 2:
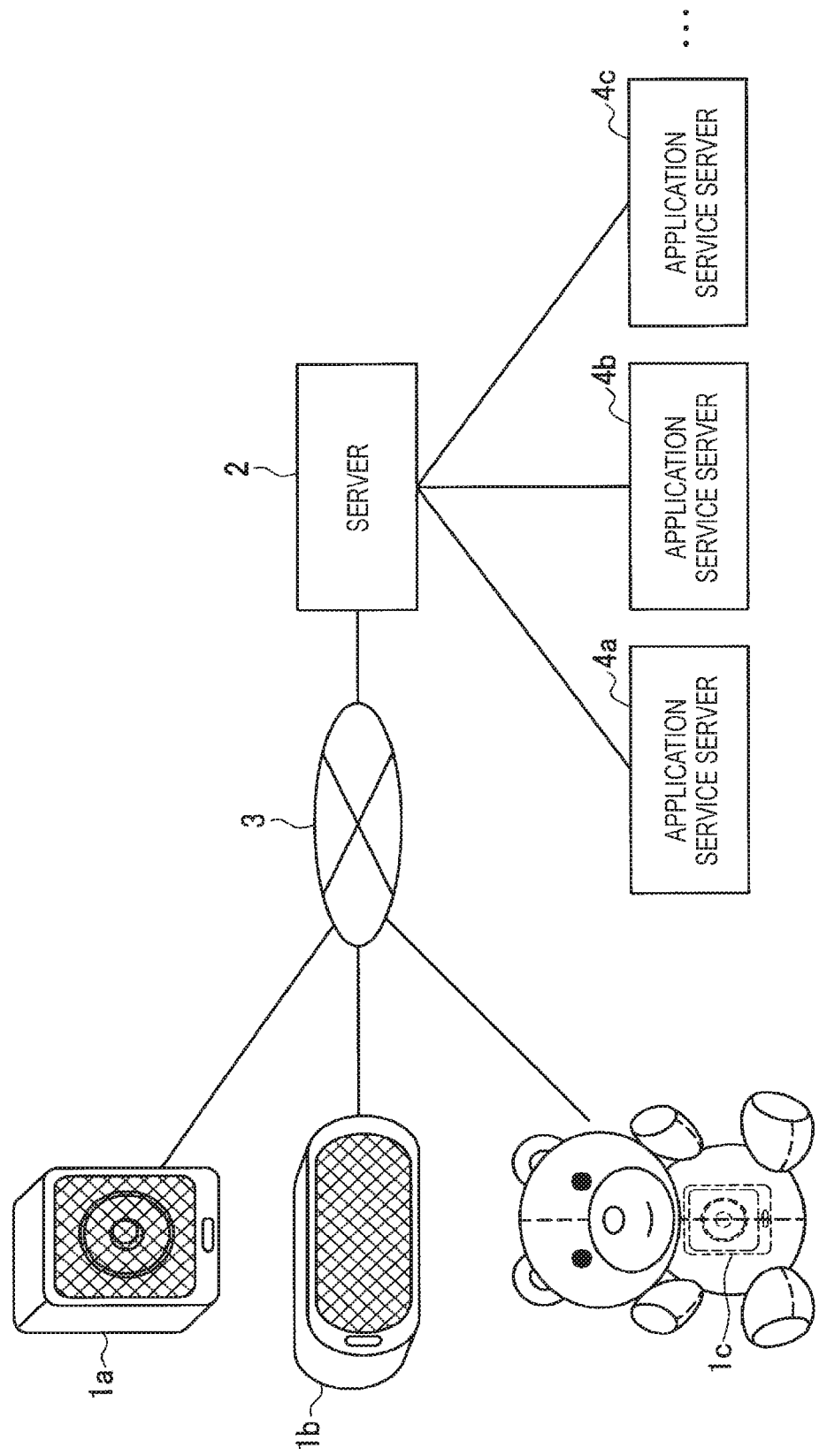
FIG. 2 is a diagram illustrating an example of an overall configuration of the information processing system according to the present embodiment.

Subsequently, an overall configuration of such an information processing system according to the present embodiment will be described with reference to FIG. 2. FIG. 2 is a diagram illustrating an example of an overall configuration of the information processing system according to the present embodiment.

As illustrated in FIG. 2, the information processing system according to the present embodiment includes a plurality of terminal devices 1 (here. three terminal devices 1a to 1c are illustrated as an example) disposed in various locations, and a server 2. A number of terminal devices 1 are assumed to be installed in various locations in a town such as a shop street, a department store, a restaurant, a clothing shop, and an amusement arcade. In addition, the forms of the terminal devices 1 are not specifically limited, and for example, the terminal devices 1 may be provided in a stuffed toy, a game machine, a robot in a shop, a costume of a local mascot, and the like.

The server 2 connects with the plurality of terminal devices 1 via a network 3, and mutually performs data transmission and reception. In addition, the server 2 performs voiceprint analysis on speech voice information received from the plurality of terminal devices 1, performs identification of a user (individual identification), and further performs determination as to whether the user is a premium user satisfying a predetermined condition, or not. In addition, in a case where the user is determined to be a premium user, response voice data for premium users is acquired and transmitted to the terminal device 1. The response voice data for premium users is acquired from a corresponding predetermined application service server 4 (4a to 4c). The application service server 4 is a server corresponding to an application service to be applied in each of the terminal devices 1, and holds a determination condition of a premium user in the service and information regarding an ID (terminal ID) of the terminal device 1 to which the service is to be applied. In addition, the application service server 4 generates response voice data for premium users (valued customer information, etc.) in response to a request from the server 2, and transmits the generated response voice data to the server 2.

Hereinbefore, the information processing system according to an embodiment of the present disclosure has been described. Subsequently, a specific configuration of each device included in the information processing system according to the present embodiment will be described with reference to the drawings.

2. Configuration

2-1. Configuration of Terminal Device 1

Figure 3:
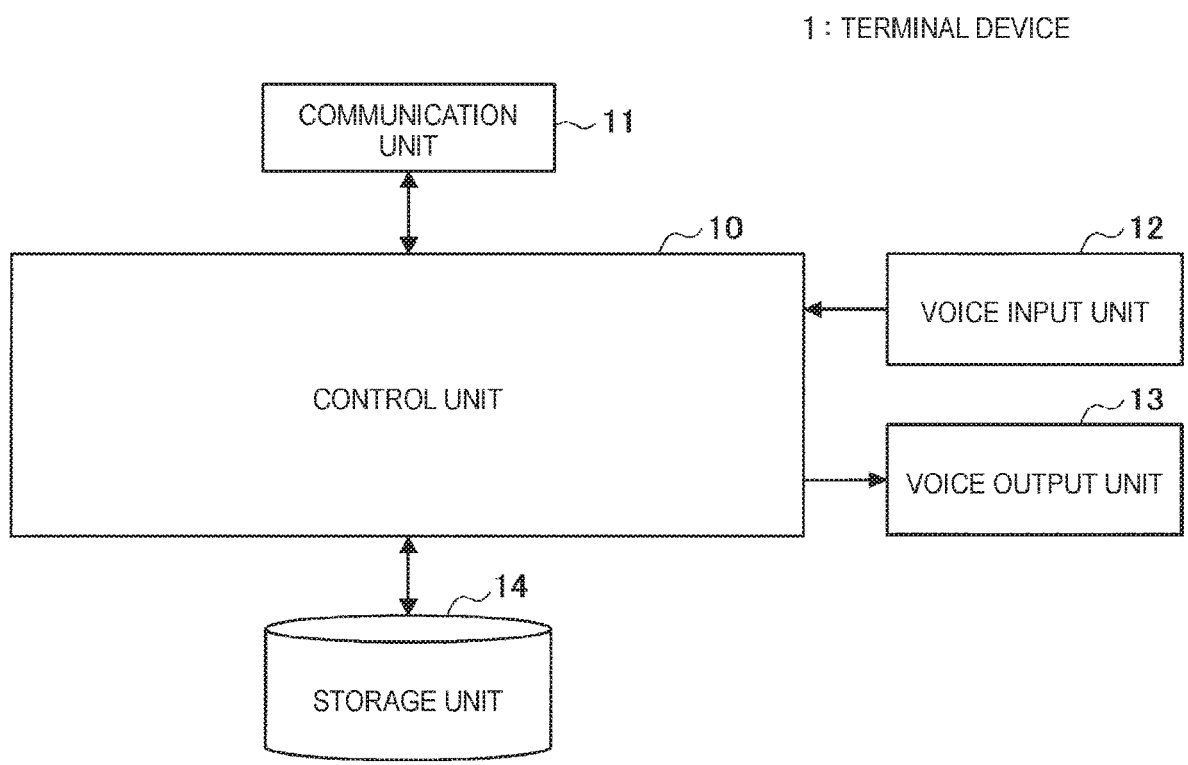
FIG. 3 is a diagram illustrating an example of a configuration of a terminal device according to the present embodiment.

FIG. 3 is a block diagram illustrating an example of a configuration of the terminal device 1 according to the present embodiment. As illustrated in FIG. 3, the terminal device 1 includes a control unit 10, a communication unit 11, the voice input unit 12, the voice output unit 13, and a storage unit 14.

The control unit 10 functions as an arithmetic processing device and a control device, and controls the overall operations in the terminal device 1 in accordance with various programs. For example, the control unit 10 is implemented by an electronic circuit such as a central processing unit (CPU) and a microprocessor. In addition, the control unit 10 may include a read only memory (ROM) that stores programs to be used, calculation parameters, and the like, and a random access memory (RAM) that temporarily stores appropriately varying parameters and the like.

In addition, the control unit 10 according to the present embodiment controls voice information collected by the voice input unit 12 (specifically, speech voice information of the user), to be continuously transmitted from the communication unit 11 to the server 2. For example, voice of the user that has been spoken in a store is thereby automatically transmitted to the server 2, and determination as to whether the user is a premium user such as a regular customer or a valued customer or not is performed. The voice information to be transmitted to the server 2 may be raw voice data, or may be processed voice data on which processing such as encoding or feature amount extraction has been performed. In addition, the control unit 10 controls voice information received from the server 2 (specifically, response voice data for premium users), to be reproduced from the voice output unit 13. It thereby becomes possible to present information for premium users.

In addition, the control unit 10 may have a function of a voice agent that automatically responds to speech of the user. Patterns of responses to user speeches may be stored in the storage unit 14 or may be acquired from the server 2.

The voice input unit 12 is implemented by a microphone, a microphone amplifier unit that performs amplification processing of a voice signal obtained by the microphone, and an A/D converter that converts the voice signal into a digital signal, and outputs the voice signal to the control unit 10.

The voice output unit 13 includes a speaker that reproduces the voice signal, and an amplifier circuit for the speaker.

The communication unit 11 connects with the network 3 in a wired or wireless manner, and performs data transmission and reception with the server 2 on the network. The communication unit 11 establishes communication connection with the network 3 by a wired/wireless local area network (LAN), Wi-Fi (registered trademark), a cellular communication network (Long Term Evolution (LTE), third-generation mobile communication method (3G)), or the like, for example.

The storage unit 14 is implemented by a read only memory (ROM) that stores programs to be used in the processing of the control unit 10, calculation parameters, and the like, and a random access memory (RAM) that temporarily stores appropriately varying parameters and the like.

Hereinbefore, the configuration of the terminal device 1 according to the present embodiment has been specifically described. Note that the configuration of the terminal device 1 is not limited to the example illustrated in FIG. 3. For example, at least either one of the voice input unit 12 or the voice output unit 13 may be provided separately from the terminal device 1.

2-2. Configuration of Server 2

Figure 4:
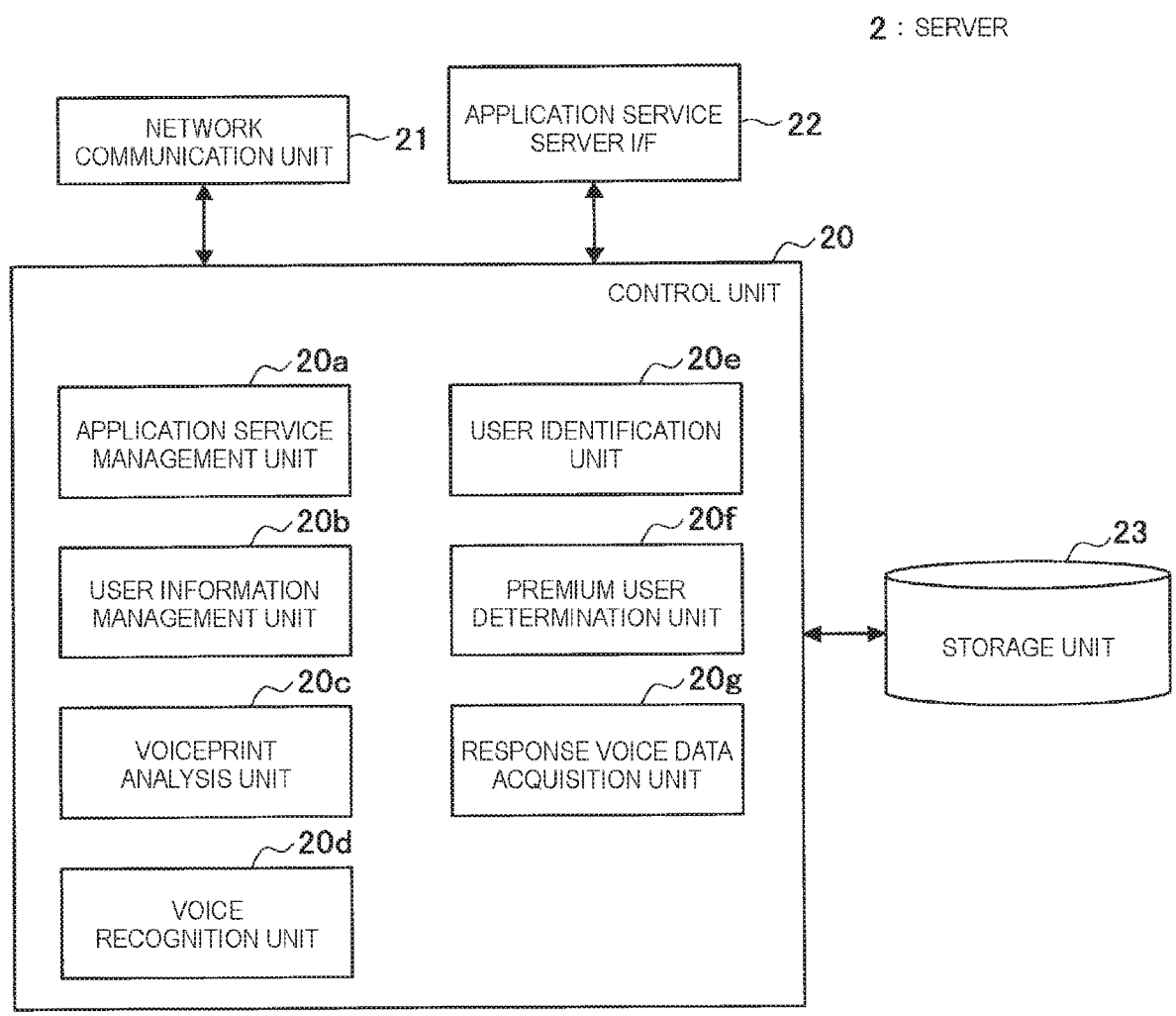
FIG. 4 is a diagram illustrating an example of a configuration of a server according to the present embodiment.

FIG. 4 is a block diagram illustrating an example of a configuration of the server 2 according to the present embodiment. As illustrated in FIG. 4, the server 2 (information processing device) includes a control unit 20, a network communication unit 21, an application service server interface (I/F) 22, and a storage unit 23.

(Control Unit 20)

The control unit 20 functions as an arithmetic processing device and a control device, and controls the overall operations in the server 2 in accordance with various programs. For example, the control unit 20 is implemented by an electronic circuit such as a central processing unit (CPU) and a microprocessor. In addition, the control unit 20 may include a read only memory (ROM) that stores programs to be used, calculation parameters, and the like, and a random access memory (RAM) that temporarily stores appropriately varying parameters and the like.

In addition, as illustrated in FIG. 4, the control unit 20 according to the present embodiment functions as an application service management unit 20a, a user information management unit 20b, a voiceprint analysis unit 20c, a voice recognition unit 20d, a user identification unit 20e, a premium user determination unit 20f, and a response voice data acquisition unit 20g.

The application service management unit 20a performs management of information regarding an application service (e.g. readout and writing of data, etc.) using an application service management table, an application service keyword list, and an application service terminal list that are stored in the storage unit 23. The information regarding an application service is acquired from each of the application service servers 4 via the application service server I/F 22.

Here, FIG. 5 illustrates an example of an application service management table according to the present embodiment. As illustrated in FIG. 5, the application service management table stores an application name and a premium user determination condition in association with an application service ID. An application service ID is identification information of an application service. An application name is a name of an application service. A premium user determination condition is a determination condition of a premium user targeted by the application service, and examples include the number of visits (the number of days the user has produced sound) within a predetermined period, the number of times the user has pronounced a predetermined keyword, and the like. In addition, a plurality of premium user determination conditions may be set. For example, in the example illustrated in FIG. 5, in an application service ID: app0001, as an "ABC shop street campaign for valued customers", a person who has ordered beef jerky ten times or more within one month can be determined as a targeted premium user for which special sale of beef jerky is to be performed, and a person who has ordered steak meat five times or more within one month can be determined as a targeted premium user for which special sale of steak meat is to be performed.

In addition, FIG. 6 illustrates an example of an application service keyword list. As illustrated in FIG. 6, the application service keyword list is a list of keywords associated with application service IDs. Specifically, the application service keyword list is a list of keywords to be used in premium user determination. Note that the number of keywords associated with each application service ID is not limited to one, and a plurality of keywords may be associated with each application service ID. In addition, a keyword with a narrower concept of a certain keyword may be further associated.

In addition, FIG. 7 illustrates an example of an application service terminal list. The application service terminal list is a list of terminal devices associated with an application service ID. For example, in the example illustrated in FIG. 7, IDs: dev0001, dev0002, and so on of terminal devices to which an application service with an application service ID: app0001 is to be applied are registered.

The user information management unit 20b performs management of information regarding a user, using a user management table stored in the storage unit 23. The information regarding a user includes a user ID allocated to each user by a system side, a voiceprint analysis result (voiceprint data), a history of keywords spoken by the user, and a user identification history. Hereinafter, specific examples of user information will be described with reference to FIGS. 8 to 10.

FIG. 8 is a diagram illustrating an example of a user management table according to the present embodiment. As illustrated in FIG. 8, the user management table includes a user ID allocated to each user, voiceprint data thereof, and a region of "application service data" that can be freely used by each application service. By storing the application service data in association with each user ID, cooperation with a function uniquely provided by each application can be implemented.

FIG. 9 is a diagram illustrating an example of a user keyword history. As illustrated in FIG. 9, in the user keyword history, time and date on which the user has pronounced a predetermined keyword (time and date of registration) and a corresponding application service ID are accumulated in association with a user ID. It thereby becomes possible to determine whether the user has pronounced a predetermined keyword within a predetermined period or not.

FIG. 10 is a diagram illustrating an example of a user identification history. As illustrated in FIG. 10, as a user identification history, an ID of a terminal device that has identified the user, and identification time and date (time and date of registration) are accumulated in association with a user ID. It thereby becomes possible to determine the number of times the user has visited a shop street or a shopping center, for example.

The voiceprint analysis unit 20c performs voiceprint analysis on voice information of user speech that has been received by the network communication unit 21 from the terminal device 1, and acquires voiceprint data (i.e. voiceprint analysis result). In the present embodiment, an algorithm of the voiceprint analysis is not specifically limited. The voiceprint data varies for each person, and it becomes possible to perform individual identification.

The voice recognition unit 20d converts the voice information of user speech into texts and performs morphological analysis and the like, and performs extraction of a keyword, meaning understanding, attribute evaluation, and the like. The attribute evaluation is estimation of gender, age, and the like of an utterer.

The user identification unit 20e performs the identification of a user on the basis of the voiceprint analysis result obtained by the voiceprint analysis unit 20c. Specifically, using the user management table stored in the storage unit 23, the user identification unit 20e compares voiceprint data associated with each user ID and the voiceprint analysis result, and identifies a user who has produced the voice.

Referring to a premium user determination condition stored in the storage unit 23, the premium user determination unit 20f determines whether the user identified by the user identification unit 20e is a premium user or not. For example, referring to user information (user keyword history and user identification history) stored in the storage unit 23, the premium user determination unit 20f determines a user who has spoken a predefined number of times or more within at least a certain period of time, to be a premium user (an example of a specific user). In addition, a premium user determination condition is set for each application service as described with reference to FIG. 5. Thus, the premium user determination unit 20f performs determination of a premium user using a determination condition of an application service to be applied to the terminal device 1 that has collected the user speech voice.

The response voice data acquisition unit 20g acquires response voice data to the user speech. Specifically, for example, the response voice data acquisition unit 20g transmits, to the application service server 4, a determination condition satisfied by the user, a terminal device ID that has collected speech voice of the user, and the like, and requests and acquires response voice data for premium users. The response voice data acquired by the response voice data acquisition unit 20g is transmitted to the terminal device 1 (device including a speaker corresponding to a microphone that has collected speech voice of a premium user) via the network communication unit 21.

(Network Communication Unit 21)

The network communication unit 21 connects with the network 3 in a wired or wireless manner, and performs data transmission and reception with each terminal device 1 via the network 3. The network communication unit 21 establishes communication connection with the network 3 by a wired/wireless local area network (LAN), Wireless Fidelity (Wi-Fi, registered trademark), or the like, for example.

(Application Service Server I/F 22)

The application service server I/F 22 performs data transmission and reception with the application service servers 4. The communication with the application service server I/F 22 may be performed via a dedicated circuit or may be performed via the network 3.

(Storage Unit 23)

The storage unit 23 is implemented by a ROM that stores programs to be used in the processing of the control unit 20, calculation parameters, and the like, and a RAM that temporarily stores appropriately varying parameters and the like. For example, the storage unit 23 according to the present embodiment stores the application service management table, the application service keyword list, the application service terminal list, the user management table, the user keyword history, and the user identification history that have been described above.

Hereinbefore, the configuration of the server 2 according to the present embodiment has been specifically described.

3. Operation Process

Subsequently, an operation process of the information processing system according to the present embodiment will be specifically described using the drawings.

3-1. Registration Process

Figure 11:
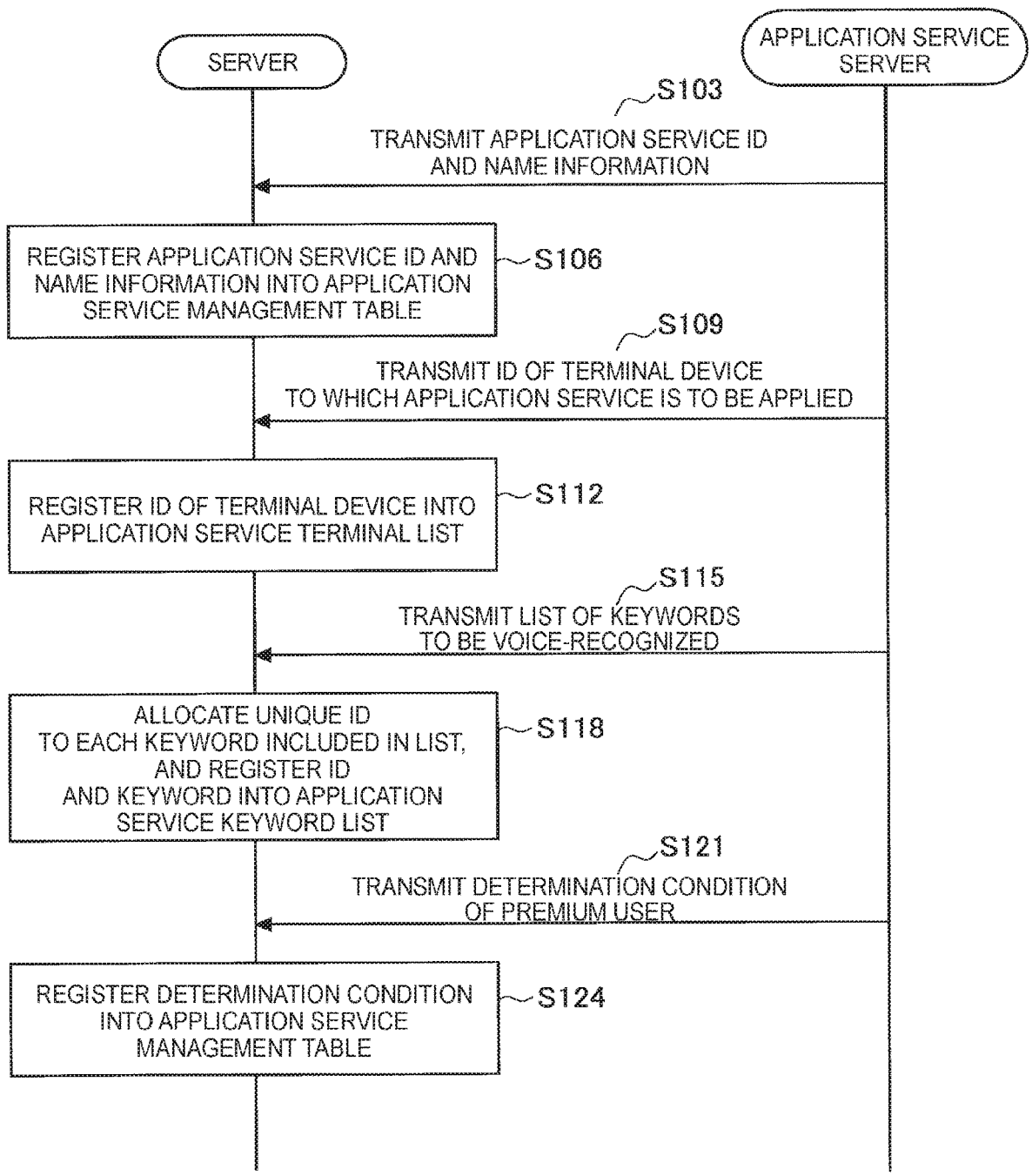
FIG. 11 is a sequence diagram illustrating a registration process of an application service according to the present embodiment.

First of all, a registration process of an application service will be described with reference to FIG. 11. FIG. 11 is a sequence diagram illustrating a registration process of an application service according to the present embodiment.

As illustrated in FIG. 11, first of all, the application service server 4 transmits an application service ID allocated to itself, and name information to the server 2 (step S103).

Next, the application service management unit 20a of the server 2 registers the received application service ID and name information into the application service management table stored in the storage unit 23 (step S106).

Subsequently, the application service server 4 transmits an ID of a terminal device to which an application service provided by itself is to be applied, to the server 2 (step S109).

Next, the application service management unit 20a of the server 2 registers the received ID of the terminal device into the application service terminal list stored in the storage unit 23, in association with the application service ID (step S112).

Subsequently, the application service server 4 transmits a list of keywords to be voice-recognized, to the server 2 (step S115).

Next, the application service management unit 20a of the server 2 allocates a unique ID to each keyword included in the received keyword list, and registers the ID and the keyword into the application service keyword list stored in the storage unit 23, in association with the application service ID (step S118).

Subsequently, the application service server 4 transmits a determination condition of a premium user to the server 2 (step S121).

Next, the application service management unit 20a of the server 2 registers the received determination condition into the application service management table stored in the storage unit 23, in association with the application service ID (step S124).

The registration process of an application service that has been described above is appropriately performed between an application service server and the server 2 for each application service.

3-2. Response Process

Figure 12:
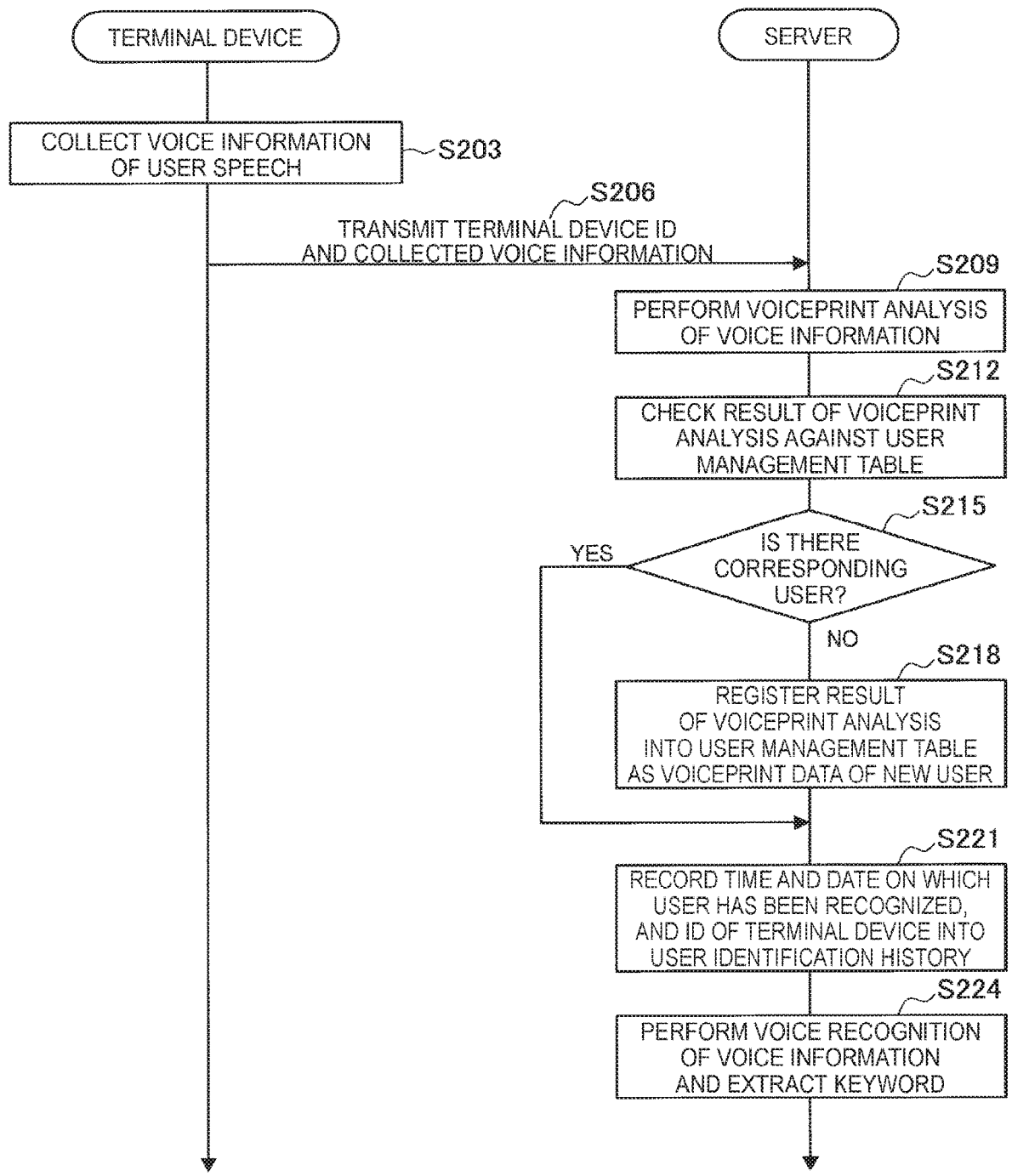
FIG. 12 is a sequence diagram illustrating a response process of the information processing system according to the present embodiment.
Figure 13:
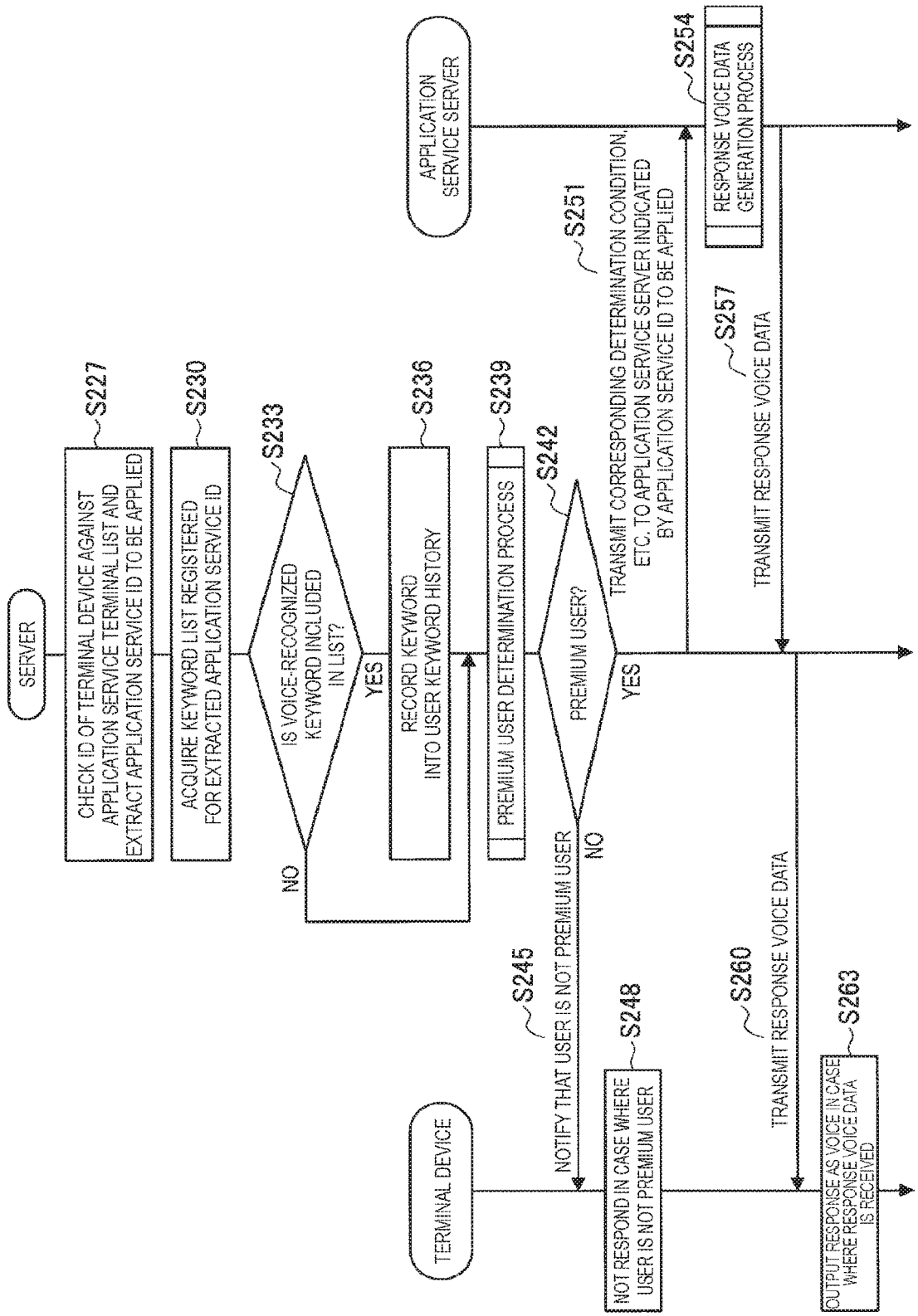
FIG. 13 is a sequence diagram illustrating a response process of the information processing system according to the present embodiment.

Subsequently, an operation process of determining a premium user and performing a response that is based on a predetermined application service will be described with reference to FIGS. 12 and 13. FIGS. 12 and 13 are sequence diagrams illustrating a response process of the information processing system according to the present embodiment.

As illustrated in FIG. 12, first of all, the terminal device 1 collects user speech voice using the voice input unit 12 (step S203). The terminal device 1 is provided inside a store or at the entrance of the store, for example, and continuously collects conversation, murmur, and the like of the user.

Next, the terminal device 1 transmits an ID of the terminal device 1 and the collected voice information to the server 2 (step S206).

Subsequently, the server 2 performs voiceprint analysis of the received voice information using the voiceprint analysis unit 20c (step S209).

Next, the server 2 checks the result of voiceprint analysis against the user management table using the user identification unit 20e (step S212). Because the user management table stores voiceprint data associated with a user ID, as described with reference to FIG. 8, by comparing the voiceprint analysis result with the voiceprint data, the identification of the user is enabled.

Subsequently, in a case where a corresponding user is not stored in the user management table (step S215/No), the result of voiceprint analysis is registered by the user information management unit 20b into the user management table as voiceprint data of a new user (step S218).

Next, the user information management unit 20b records time and date on which the user has been recognized, and the received ID of the terminal device into the user identification history (step S221). A case where "the user has been recognized" corresponds to a case where there is a corresponding user in step S215 described above, or a case where a new user has been registered in step S218 described above.

Subsequently, the server 2 performs voice recognition of the voice information of user speech that has been received from the terminal device 1, using the voice recognition unit 20d, and extracts a keyword from speech content (step S224) Specifically, the voice recognition unit 20d performs text conversion and morphological analysis of the voice information, and performs the extraction of a keyword from the speech texts (here, broadly extracts a word).

Next, as illustrated in FIG. 13, the server 2 checks the received ID of the terminal device 1 against the application service terminal list (refer to FIG. 7) using the application service management unit 20a, and extracts an application service ID to be applied to the terminal device 1 (step S227).

Subsequently, the voice recognition unit 20d acquires a keyword list (refer to FIG. 6) registered for the extracted application service ID (step S230).

Next, the voice recognition unit 20d determines whether the keyword extracted from the voice information of user speech by voice recognition is included in the above-described keyword list or not (step S233).

Subsequently, in a case where the keyword is included in the keyword list (step S233/Yes), the user information management unit 20b records the keyword into the user keyword history (refer to FIG. 9) (step S236).

Next, the premium user determination unit 20f performs a premium user determination process (step S239). Specifically, in accordance with a premium user determination condition set in the application service management table, the premium user determination unit 20f determines whether the user that has spoken is a premium user or not. Note that the premium user determination condition varies depending on an application service to be applied. Specific examples of the premium user determination condition will be described later using a plurality of embodiments.

Subsequently, in a case where it is determined by the premium user determination unit 20f that the user is not a premium user (step S242/No), the server 2 notifies the terminal device 1 that the user is not a premium user (step S245).

Then, in a case where it is determined by the server 2 that the user is not a premium user, the terminal device 1 does not perform a response to the user (step S248). Note that the terminal device 1 may perform an automatic response for general users by a voice agent, such as "Welcome", even if the terminal device 1 does not perform a response for premium users that is based on an application service.

On the other hand, in a case where the user is determined to be a premium user (step S242/Yes), the server 2 transmits, to the application service server 4 indicated by an application service ID to be applied, a corresponding determination condition and the like (e.g. including a corresponding determination condition, a user ID of a premium user, and a terminal device ID) (step S251).

Next, in accordance with information received from the server 2, the application service server 4 generates response voice data for premium users (step S254). The response voice data for premium users may be held in advance in the application service server 4, or may be generated by a predetermined algorithm. Note that specific examples of response voice data to be generated will be described later using a plurality of embodiments.

Subsequently, the application service server 4 transmits the generated response voice data for premium users to the server 2 (step S257).

Next, the server 2 transmits the response voice data received from the application service server 4, to the terminal device 1 (step S260).

Then, the terminal device 1 outputs, as voice, the response voice data received from the server 2, from the voice output unit 13 (step S263). In the present embodiment, it thereby becomes possible to perform a special response that is based on a corresponding application service (e.g. provision of campaign information for regular customers, etc.), to the user determined to be a premium user.

Hereinbefore, the response process according to the present embodiment has been described.

Subsequently, specific examples of the determination process of a premium user and the generation process of response voice data that have been described above will be described using a plurality of embodiments.

4. Embodiments

4-1. First Embodiment

In the first embodiment, in a case where a user identified by voiceprint analysis has pronounced something in a store at high frequency in the past (i.e. has visited the store at high frequency), the user is determined to be a premium user. Note that an application service to be used in the present embodiment corresponds to "an application service ID: app0002, an application name: DD mall visit thanks event, a determination condition: a case where a user has visited a shop (pronounced something) five days within one week" registered in the application service management table illustrated in FIG. 5.

Figure 14:
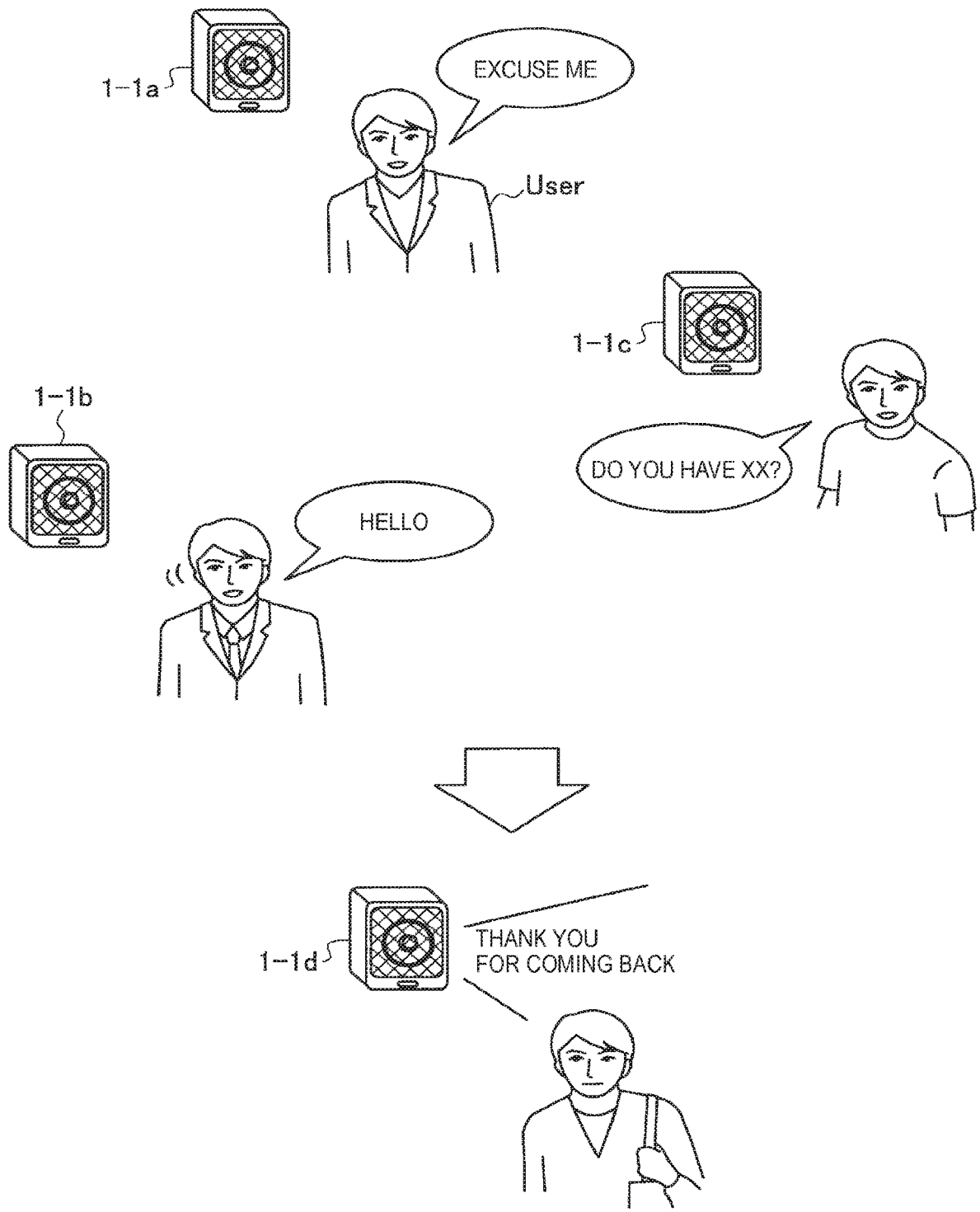
FIG. 14 is a diagram describing an overview of a first embodiment.

FIG. 14 is a diagram describing an overview of the present embodiment. In the present embodiment, as illustrated in an upper section in FIG. 14, for example, in a case where a visiting user has pronounced something a predetermined number of days (e.g. five days) or more within a predetermined period (e.g. within one week) near a number of terminal devices 1-1a to 1-1c (may be singular) installed in a "DD mall", it can be estimated that the user visits the DD mall at high frequency. Thus, the user is determined to be a premium user.

Then, as illustrated in a lower section in FIG. 14, special response voice such as "Thank you for coming back" is output from a terminal device 1-1d gratefully and endearingly for high visit frequency. Campaign information may be provided together. The user can thereby feel gratefulness and endearing feeling from the shop side. Note that all of the terminal devices 1-1a to 1-1d are a terminal device group installed in the DD mall, and when voice production is recognized in at least any of the terminal devices 1-1, user identification is performed. Nevertheless, the present embodiment is not limited to this, and the number of terminal devices 1-1 installed in the DD mall may be one.

(Operation Process)

Subsequently, an operation process according to the first embodiment will be described. Because a basic operation process according to the present embodiment is mainly similar to the operation process described with reference to FIGS. 12 and 13, here, a premium user determination process (step S239 illustrated in FIG. 13) and a response voice data generation process (step S254 illustrated in FIG. 13), which are processes specific to the present embodiment, will be sequentially described with reference to FIGS. 15 and 16.

Premium User Determination Process

Figure 15:
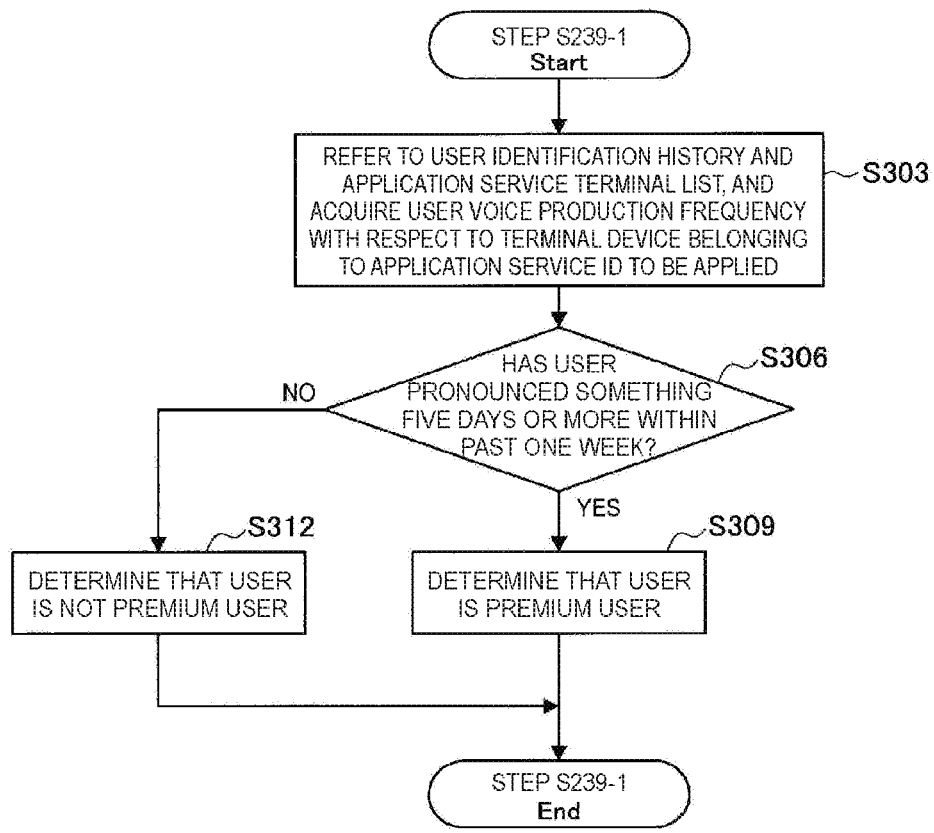
FIG. 15 is a flowchart illustrating a determination process of a premium user according to the first embodiment.

FIG. 15 is a flowchart illustrating a determination process of a premium user according to the first embodiment. As illustrated in FIG. 15, first of all, the premium user determination unit 20f of the server 2 refers to the user identification history (refer to FIG. 10) and the application service terminal list that are stored in the storage unit 23, and acquires voice production frequency of a user with respect to a terminal device belonging to an application service ID to be applied (step S303). Specifically, for example, the premium user determination unit 20f extracts, from the application service terminal list, the terminal devices 1-1a to 1-1c belonging to the same application service ID as an application service ID to be applied to the terminal device 1-1d. Subsequently, the premium user determination unit 20f checks against the user identification history, and acquires time and date on which the user has been identified by the terminal devices 1-1a to 1-1d (i.e. speech of the user has been recognized by voiceprint analysis) (voice production frequency).

Next, in accordance with a premium user determination condition of the application service ID: app0002 that is registered in the application service management table, the premium user determination unit 20f determines whether the user has pronounced something five days or more within the past one week or not (step S306).

Subsequently, in a case where the user satisfies the above-described determination condition (step S306/Yes), the premium user determination unit 20f determines that the user is a premium user (step S309).

On the other hand, in a case where the user does not satisfy the above-described determination condition (step S309/No), the premium user determination unit 20f determines that the user is not a premium user (step S312).

Hereinbefore, the premium user determination process according to the first embodiment has been specifically described. In the present embodiment, a user who has pronounced something a predetermined number of days or more within a predetermined period (i.e. user estimated to have visited a shop a predetermined number of days or more within a predetermined period) is determined to be a premium user without specifically identifying a keyword.

Response Voice Data Generation Process

Figure 16:
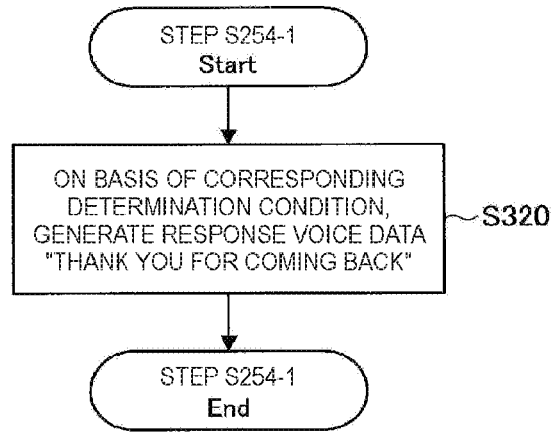
FIG. 16 is a flowchart illustrating a generation process of response voice data according to the first embodiment.

FIG. 16 is a flowchart illustrating a generation process of response voice data according to the first embodiment. As illustrated in FIG. 16, on the basis of a corresponding determination condition received from the server 2, the application service server 4 generates predetermined response voice data such as "Thank you for coming back", for example (step S320). The application service server 4 can hold response voice data corresponding to a determination condition, or a generation algorithm of response voice data, for example, and generate response voice data on the basis of a "corresponding determination condition" received from the server 2.

Hereinbefore, the generation process of response voice data according to the first embodiment has been specifically described. As illustrated in steps S257 to S263 in FIG. 13, the response voice data generated by the application service server 4 is transmitted from the application service server 4 to the terminal device 1-1 via the server 2, and output as voice from the terminal device 1-1.

4-2. Second Embodiment

In the second embodiment, in a case where a user identified by voiceprint analysis has pronounced a predetermined keyword in a store at high frequency in the past, the user is determined to be a premium user. Note that an application service to be used in the present embodiment corresponds to "an application service ID: app0001, an application name: ABC shop street valued customer campaign, a determination condition: the user has ordered "beef jerky" (pronounced "beef jerky") ten times within one month" registered in the application service management table illustrated in FIG. 5.

Figure 17:
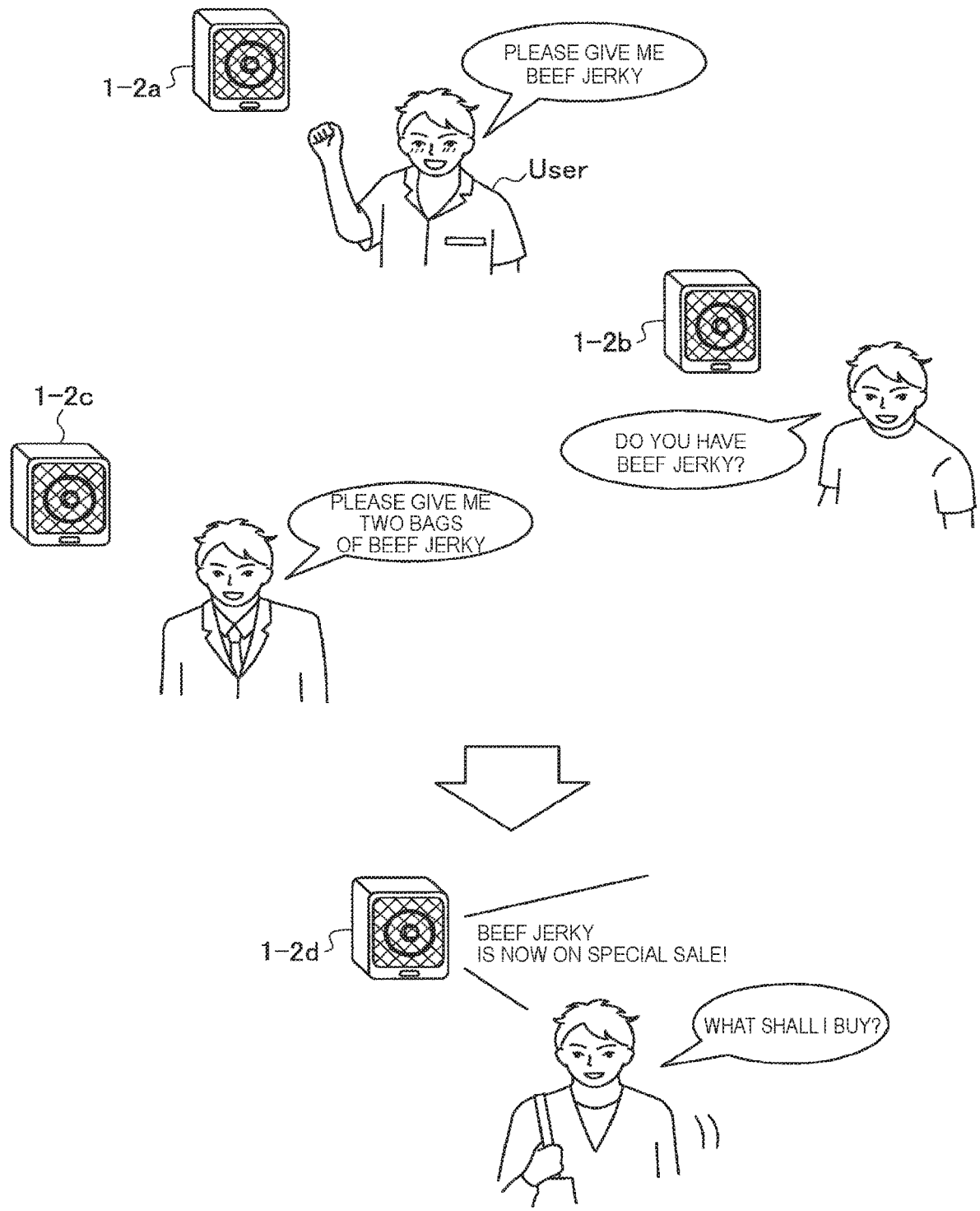
FIG. 17 is a diagram describing an overview of a second embodiment.

FIG. 17 is a diagram describing an overview of the present embodiment. In the present embodiment, as illustrated in an upper section in FIG. 17, for example, in a case where a visiting user has pronounced a predetermined keyword "beef jerky" a predetermined number of times (e.g. ten times) or more within a predetermined period (e.g. one month) near a number of terminal devices 1-2a to 1-2c (may be singular) installed in an "ABC shop street", it can be estimated that the user purchases beef jerky at high frequency. Thus, the user is determined to be a premium user.

Then, as illustrated in a lower section in FIG. 17, good deal information such as "beef jerky is now on special sale!" is output from a terminal device 1-2d to a user being a regular customer that purchases "beef jerky at high frequency. Note that all of the terminal devices 1-2a to 1-2d are a terminal device group installed in the ABC shop street, and when voice production is recognized in at least any of the terminal devices 1-2, user identification is performed. Nevertheless, the present embodiment is not limited to this, and the number of terminal devices 1-2 may be one.

(Operation Process)

Subsequently, an operation process according to the second embodiment will be described. Because a basic operation process according to the present embodiment is mainly similar to the operation process described with reference to FIGS. 12 and 13, here, a premium user determination process (step S239 illustrated in FIG. 13) and a response voice data generation process (step S254 illustrated in FIG. 13), which are processes specific to the present embodiment, will be sequentially described with reference to FIGS. 18 and 19.

Premium User Determination Process

Figure 18:
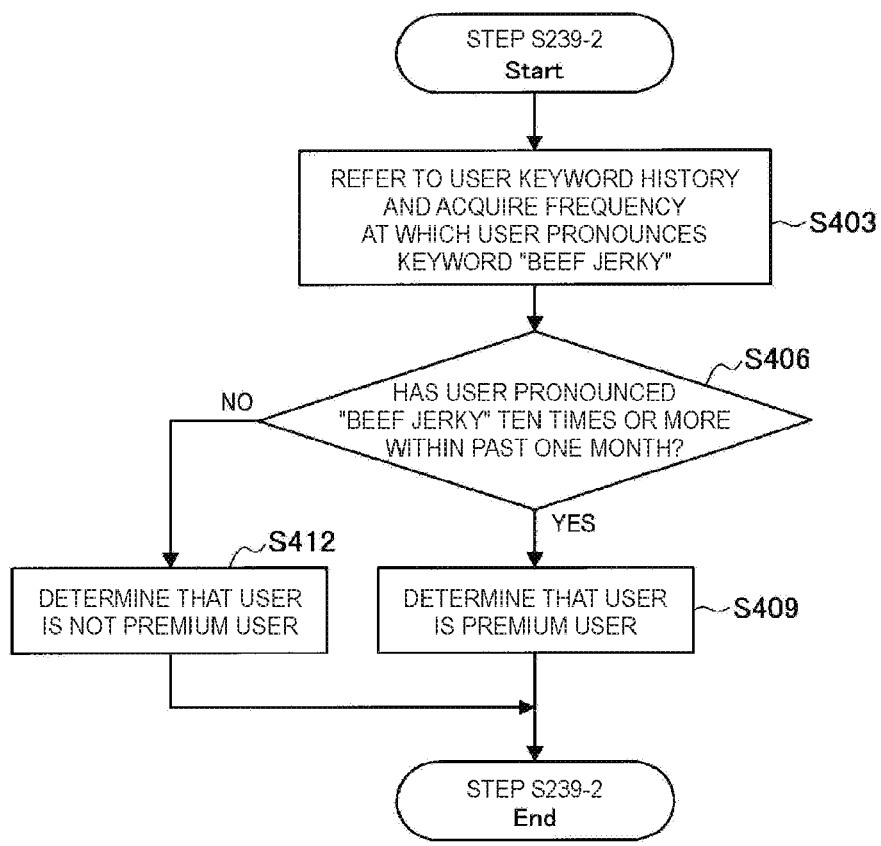
FIG. 18 is a flowchart illustrating a determination process of a premium user according to the second embodiment.

FIG. 18 is a flowchart illustrating a determination process of a premium user according to the second embodiment. As illustrated in FIG. 18, first of all, the premium user determination unit 20f of the server 2 refers to the user keyword history (refer to FIG. 9) stored in the storage unit 23, and acquires frequency at which the user pronounces the predetermined keyword "beef jerky" (step S403). Specifically, for example, the premium user determination unit 20f extracts, from the application service keyword list, a predetermined keyword to be used in a determination condition of a premium user targeted by an application service to be applied to the terminal device 1-2d. Subsequently, the premium user determination unit 20f checks against the user keyword history, and acquires time and date on which the user has pronounced the predetermined keyword (voice production frequency).

Next, in accordance with a premium user determination condition of the application service ID: app0001 registered in the application service management table, the premium user determination unit 20f determines whether the user has pronounced "beef jerky" ten times or more within the past one month or not (step S406).

Subsequently, in a case where the user satisfies the above-described determination condition (step S406/Yes), the premium user determination unit 20f determines that the user is a premium user (step S409).

On the other hand, in a case where the user does not satisfy the above-described determination condition (step S409/No), the premium user determination unit 20f determines that the user is not a premium user (step S412).

Hereinbefore, the premium user determination process according to the second embodiment has been specifically described. In the present embodiment, a user who has pronounced a predetermined keyword a predetermined number of times or more within a predetermined period (e.g. in a case where the terminal devices 1-2 are installed near a cash register, a user estimated to have ordered a product of a predetermined keyword a predetermined number of times or more within a predetermined period) is determined to be a premium user.

Response Voice Data Generation Process

Figure 19:
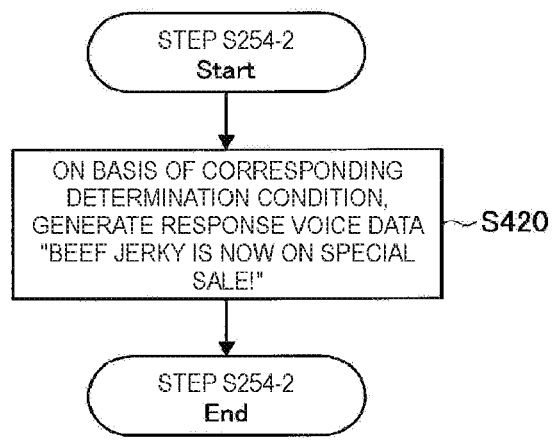
FIG. 19 is a flowchart illustrating a generation process of response voice data according to the second embodiment.

FIG. 19 is a flowchart illustrating a generation process of response voice data according to the second embodiment. As illustrated in FIG. 19, on the basis of a corresponding determination condition received from the server 2, the application service server 4 generates predetermined response voice data such as "Beef Jerky is now on special sale!", for example (step S420). The application service server 4 can hold response voice data corresponding to a determination condition, or a generation algorithm of response voice data, for example, and generate response voice data on the basis of a "corresponding determination condition" received from the server 2.

Hereinbefore, the generation process of response voice data according to the second embodiment has been specifically described. As illustrated in steps S257 to S263 in FIG. 13, the response voice data generated by the application service server 4 is transmitted from the application service server 4 to the terminal device 1-2 via the server 2, and output as voice from the terminal device 1-2.

Note that a location where the terminal device 1-2 is installed is not limited to a shop street and a mall, and may be a street stall in a town such as a fortune-telling space, for example. FIG. 20 is a diagram describing an application example of the present embodiment.

As illustrated in FIG. 20, for example, in a case where the terminal device 1-2 is installed in a fortune-telling space in a town, in a case where a user passing in front of a fortune-teller has frequently pronounced a predetermined keyword indicating a trouble, such as "depressed", "worried", and "concerned", in conversation made with an accompanying person or the like (e.g. in a case where the user has pronounced a word indicating a trouble, five times or more within one week), response voice data recommending fortune-telling may be output to the user from the terminal device 1-2.

4-3. Third Embodiment

In the third embodiment, in a case where a user identified by voiceprint analysis has pronounced something in a store at high frequency in the past, has a specific user attribute, and has pronounced a predetermined keyword, the user is determined to be a premium user. The user attribute is gender, age, and the like of the user that are estimated by voice recognition of speech voice data of the user. Note that an application service to be used in the present embodiment corresponds to "an application service ID: app0003, an application name: EE shopping center male premium user privilege, a determination condition: a case where the user has visited a shop (pronounced something in the shop) five days within one week, is a male adult, and has pronounced a specific keyword "it is hot" registered in the application service management table illustrated in FIG. 5.

Figure 21:
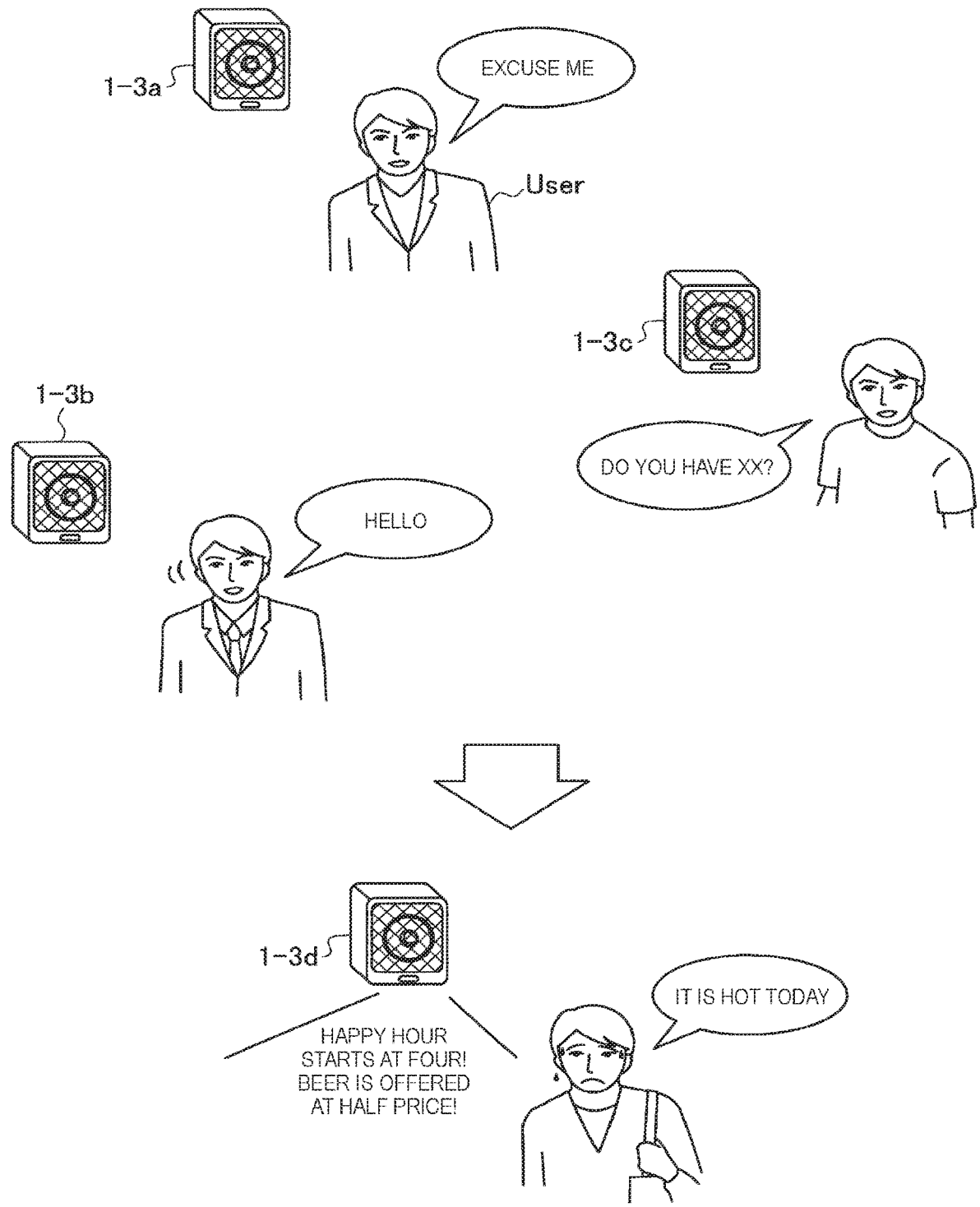
FIG. 21 is a diagram describing an overview of a third embodiment.

FIG. 21 is a diagram describing an overview of the present embodiment. In the present embodiment, in a case where a user visiting a store has pronounced something a predetermined number of days (e.g. five days) or more within a predetermined period (e.g. one week) near a number of terminal devices 1-3a to 1-3c (may be singular) installed in an "EE shopping center", for example, as illustrated in an upper section in FIG. 21, an attribute of the user is a "male adult", and the user has pronounced a predetermined keyword "it is hot" as illustrated in a lower section in FIG. 21, the user is determined to be a premium user.

Then, as good deal information for premium users, response voice such as "Happy hour starts at four! Beer is offered at half price!" is output from a terminal device 1-3d. Special information such as a campaign can be thereby presented to a user who is a person having a specific attribute, and has pronounced a specific keyword, among regular customers. Note that all of the terminal devices 1-3a to 1-3d are a terminal device group installed in the EE shopping center, and voice production is recognized in at least any of the terminal devices 1-3, and user identification is performed. Nevertheless, the present embodiment is not limited to this, and the number of terminal devices 1-3 may be one.

(Operation Process)

Subsequently, an operation process according to the third embodiment will be described. Because a basic operation process according to the present embodiment is mainly similar to the operation process described with reference to FIGS. 12 and 13, here, a premium user determination process (step S239 illustrated in FIG. 13) and a response voice data generation process (step S254 illustrated in FIG. 13), which are processes specific to the present embodiment, will be sequentially described with reference to FIGS. 22 and 23.

Premium User Determination Process

Figure 22:
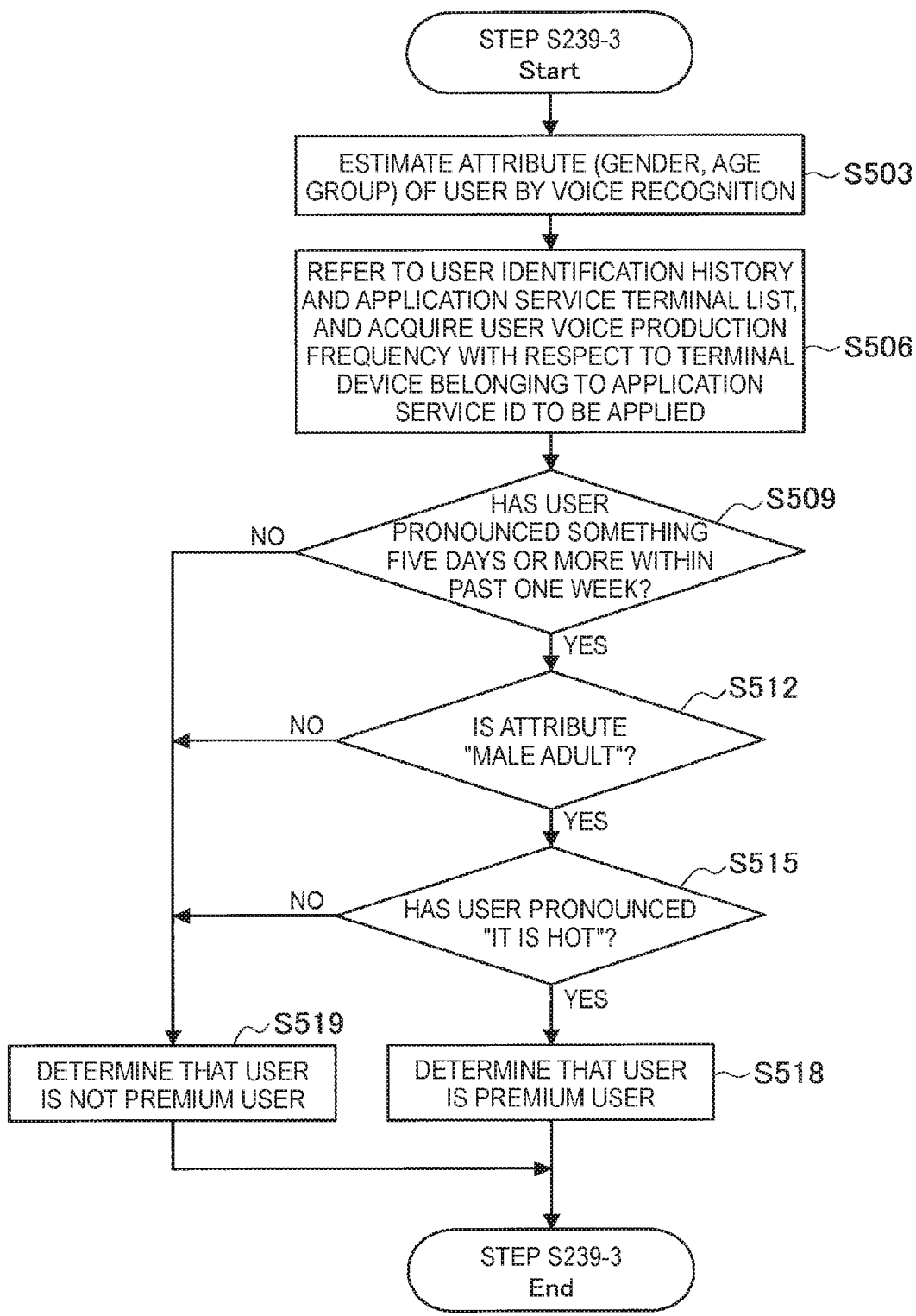
FIG. 22 is a flowchart illustrating a determination process of a premium user according to the third embodiment.

FIG. 22 is a flowchart illustrating a determination process of a premium user according to the third embodiment. As illustrated in FIG. 22, first of all, the server 2 estimates an attribute (gender, age group, etc.) of a user by voice recognition of speech voice information (step S503). Specifically, for example, the control unit 20 of the server 2 estimates gender and an age group (age) as a user attribute from a way of speaking, tone of voice, a way of pronouncing the end of a word, vocal sound, a pitch of voice, features of voice, a voiceprint, or the like of the user.

Subsequently, the premium user determination unit 20f of the server 2 refers to the user identification history (refer to FIG. 10) and the application service terminal list that are stored in the storage unit 23, and acquires voice production frequency of a user with respect to a terminal device belonging to an application service ID to be applied (step S506). Specifically, for example, the premium user determination unit 20f extracts, from the application service terminal list, the terminal devices 1-3a to 1-3c belonging to the same application service ID as an application service ID to be applied to the terminal device 1-3d. Subsequently, the premium user determination unit 20f checks against the user identification history, and acquires time and date on which the user has been identified by the terminal devices 1-3a to 1-3d (i.e. speech of the user has been recognized by voiceprint analysis) (voice production frequency).

Next, in accordance with a premium user determination condition of an application service ID: app0003 registered in the application service management table, the premium user determination unit 20f determines whether the user has pronounced something five days or more within the past one week or not (step S509), whether an attribute is a "male adult" or not (step S512), and whether the user has pronounced a predetermined keyword "it is hot" or not (step S515).

Subsequently, in a case where the user satisfies all of the above-described conditions (step S509/Yes, step S512/Yes, step S515/Yes), the premium user determination unit 20f determines that the user is a premium user (step S518).

On the other hand, in a case where the user does not satisfy at least any of the above-described conditions (step S509/No, step S512/No, or step S515/No), the premium user determination unit 20f determines that the user is not a premium user (step S519).

Hereinbefore, the premium user determination process according to the third embodiment has been specifically described. In the present embodiment, in a case where a user has pronounced something a predetermined number of days or more within a predetermined period without specifically identifying a keyword (i.e. user estimated to have visited a shop a predetermined number of days or more within a predetermined period), has a predetermined attribute, and has further pronounced a specific keyword serving as a trigger, the user is determined to be a premium user.

Response Voice Data Generation Process

Figure 23:
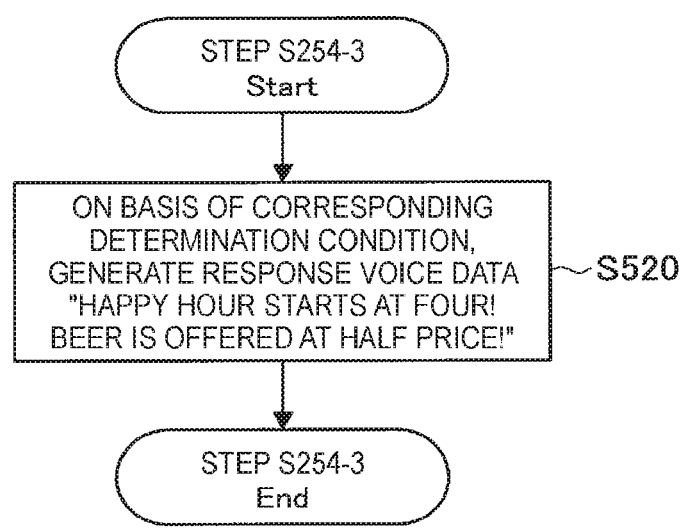
FIG. 23 is a flowchart illustrating a generation process of response voice data according to the third embodiment.

FIG. 23 is a flowchart illustrating a generation process of response voice data according to the third embodiment. As illustrated in FIG. 23, on the basis of a corresponding determination condition received from the server 2, the application service server 4 generates predetermined response voice data such as "Happy hour starts at four! Beer is offered at half price!", for example (step S520). The application service server 4 can hold response voice data corresponding to a determination condition, or a generation algorithm of response voice data, for example, and generate response voice data on the basis of a "corresponding determination condition" received from the server 2.

Hereinbefore, the generation process of response voice data according to the third embodiment has been specifically described. As illustrated in steps S257 to S263 in FIG. 13, the response voice data generated by the application service server 4 is transmitted from the application service server 4 to the terminal device 1-3 via the server 2, and output as voice from the terminal device 1-3.

4-3-1. Application Example 1

Note that a location where the terminal device 1-3 is installed is not limited to a store, and may be a recreation hall such as an amusement arcade, for example. Here, a case where the terminal device 1-3 is installed in an amusement arcade will be described with reference to FIGS. 24 to 27.

FIG. 24 is a diagram describing an overview of Application Example 1 of the present embodiment. As illustrated in an upper section in FIG. 24, for example, in a case where the terminal device 1-3a is installed around a game machine 5, and a male-adult user who frequently (e.g. ten days or more within one month) passes in front of the game machine 5 has pronounced a predetermined keyword requesting stress release, such as "I feel frustrated", "I feel irritated", and "I want to beat up" in conversation made with an accompanying person, muttering to oneself, or the like, it can be estimated that the user is a regular customer who visits the amusement arcade at high frequency, and an optimum state for recommending a game is now caused, and the user is determined to be a premium user.

Then, in a case where the user is determined to be a premium user, as illustrated in a lower section in FIG. 24, response voice data recommending stress release by the game machine 5 of punching a punching bag is output from the terminal device 1-3a.

In addition, a play history (scores) of the game machine 5 is referred to, and in a case where an average of scores (an example of user information) taken so far by the user exceeds the highest score of all the players who played on the day, a response recommending a game and including a message such as "you can be the top today if you play as usual." can also be performed.

(Operation Process)

Subsequently, an operation process according to this application example will be described. Because a basic operation process according to the present embodiment is mainly similar to the operation process described with reference to FIGS. 12 and 13, here, a premium user determination process (step S239 illustrated in FIG. 13) and a response voice data generation process (step S254 illustrated in FIG. 13), which are processes specific to the present embodiment, will be sequentially described with reference to FIGS. 25 and 26.

Premium User Determination Process

Figure 25:
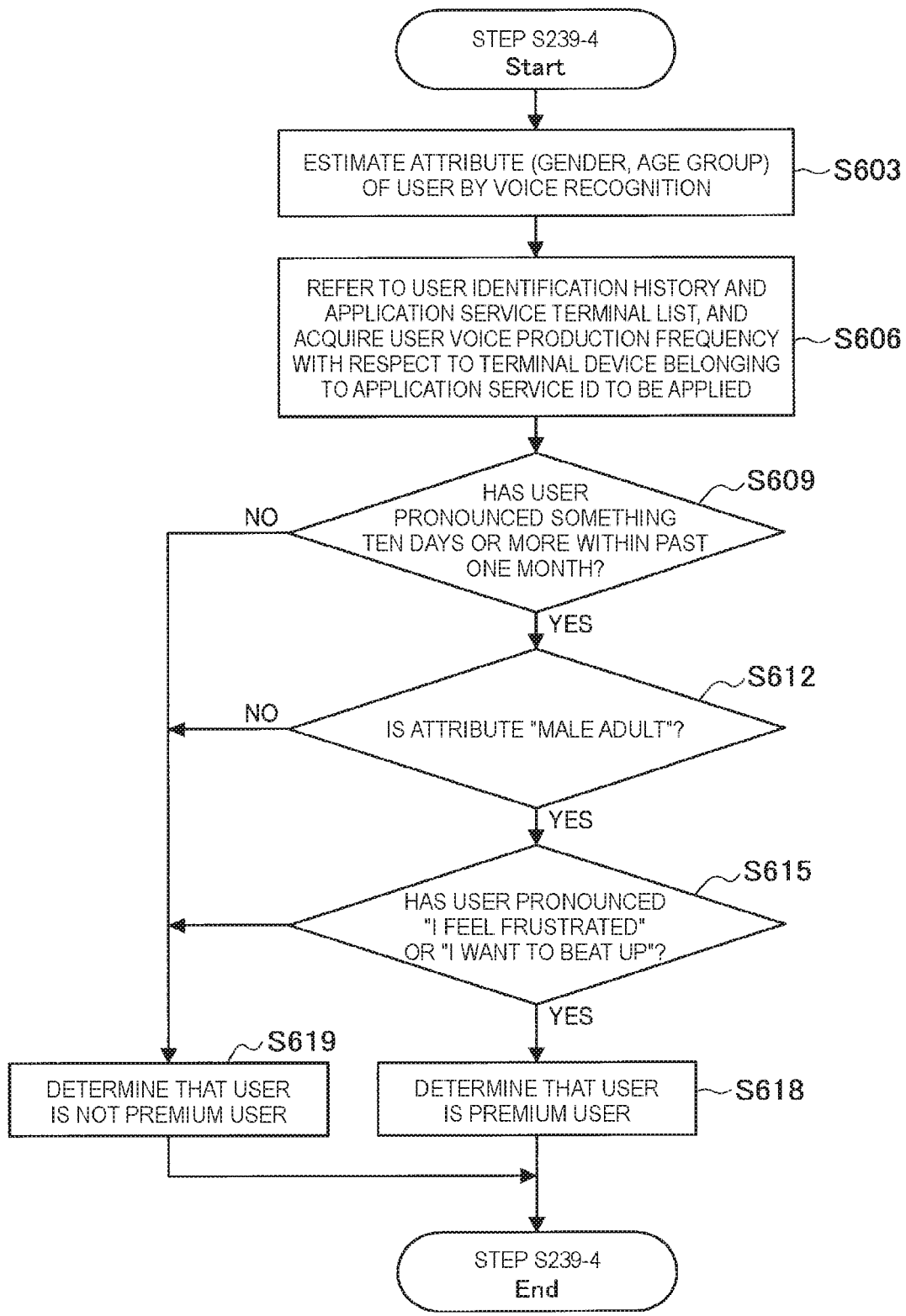
FIG. 25 is a flowchart illustrating a determination process of a premium user according to Application Example 1 of the third embodiment.

FIG. 25 is a flowchart illustrating a determination process of a premium user according to Application Example 1. As illustrated in FIG. 25, first of all, the server 2 estimates an attribute (gender, age group, etc.) of a user by voice recognition of speech voice information (step S603). Specifically, for example, the control unit 20 of the server 2 estimates gender and an age group (age) as a user attribute from a way of speaking, tone of voice, vocal sound, a pitch of voice, features of voice, a voiceprint, or the like of the user.

Subsequently, the premium user determination unit 20f of the server 2 refers to the user identification history (refer to FIG. 10) and the application service terminal list (refer to FIG. 7) that are stored in the storage unit 23, and acquires voice production frequency of a user with respect to a terminal device belonging to an application service ID to be applied (step S606). Specifically, for example, the premium user determination unit 20f extracts, from the application service terminal list, the terminal devices (e.g. a plurality of terminal devices installed around a game machine or in an amusement arcade) belonging to the same application service ID as an application service ID to be applied to the terminal device 1-3a. Subsequently, the premium user determination unit 20f checks against the user identification history, and acquires time and date on which the user has been identified by the terminal device 1-3a and a terminal device belonging to the same application service ID (i.e. speech of the user has been recognized by voiceprint analysis) (voice production frequency).

Next, in accordance with a premium user determination condition of the application service registered in the application service management table, the premium user determination unit 20f performs determination of a premium user (steps S609 to S615). Specifically, for example, the premium user determination unit 20f determines whether the user has pronounced something ten days or more within the past one month or not (step S609), whether an attribute is a "male adult" or not (step S612), and whether the user has pronounced a word requesting stress release, such as a predetermined keyword "I feel frustrated" or "I want to beat up", or not (step S615). Note that all of the determination conditions are examples, and this application example is not limited to this.

Subsequently, in a case where the user satisfies all of the above-described conditions (step S609/Yes, step S612/Yes, step S615/Yes), the premium user determination unit 20f determines that the user is a premium user (step S618).

On the other hand, in a case where the user does not satisfy at least any of the above-described conditions (step S609/No, step S612/No, or step S615/No), the premium user determination unit 20f determines that the user is not a premium user (step S619).

Hereinbefore, the premium user determination process according to Application Example 1 has been specifically described. In this application example, in a case where a user has pronounced something a predetermined number of days or more within a predetermined period without specifically identifying a keyword (i.e. user estimated to have visited a shop a predetermined number of days or more within a predetermined period), has a predetermined attribute, and has further pronounced a specific keyword serving as a trigger, the user is determined to be a premium user.

Response Voice Data Generation Process

Figure 26:
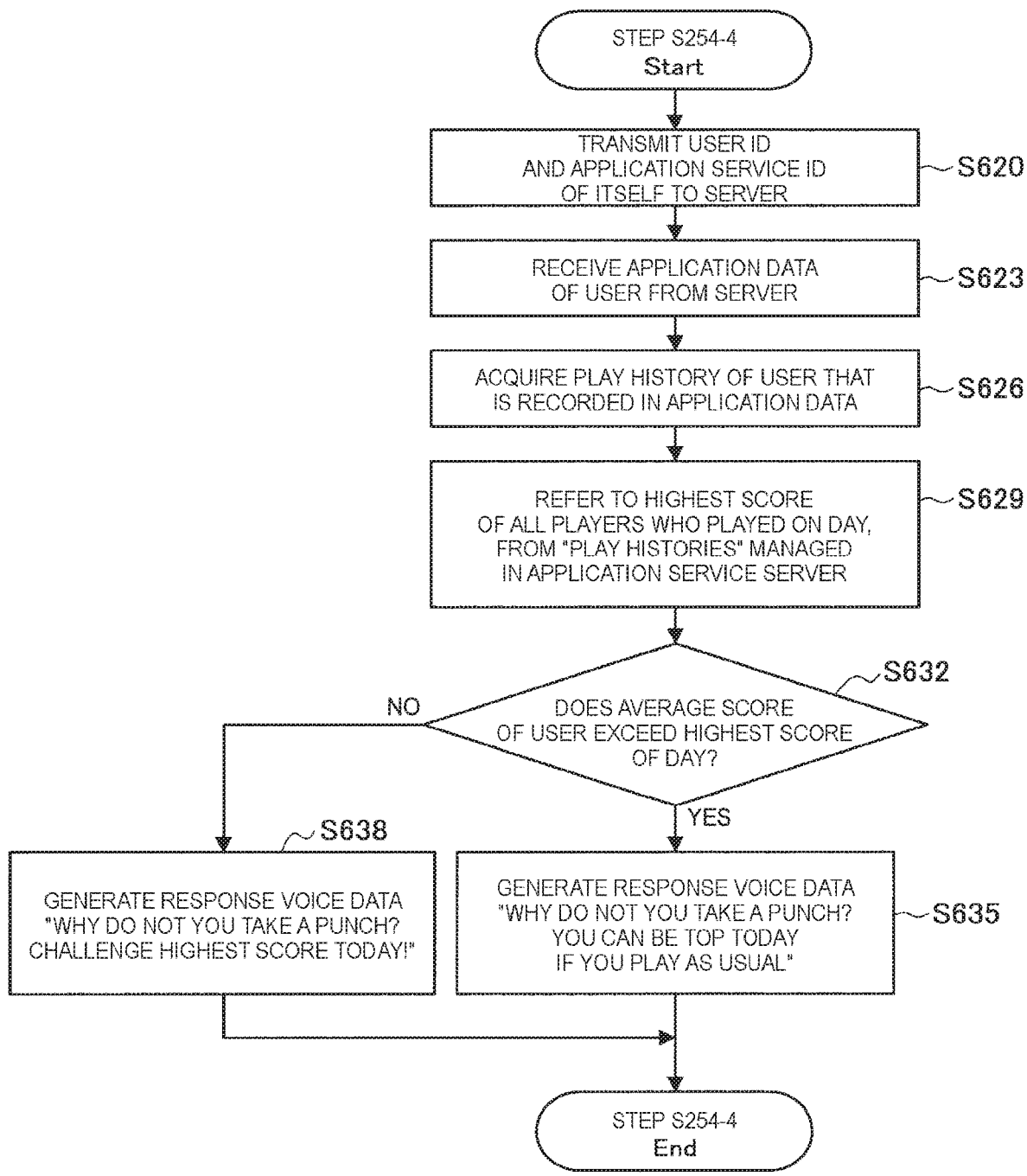
FIG. 26 is a flowchart illustrating a generation process of response voice data according to Application Example 1 of the third embodiment.

FIG. 26 is a flowchart illustrating a generation process of response voice data according to this application example. In this application example, response voice data is generated considering a game play history as well. A play history of each user is accumulated in the "application service data" in the user management table (refer to FIG. 8) stored in the storage unit 23 of the server 2, for example.

As illustrated in FIG. 26, first of all, the application service server 4 transmits a user ID of a user determined to be a premium user, and an application service ID to the server 2 (step S620).

Next, the application service server 4 receives application data of the user from the server 2 (step S623), and acquires a play history of the user in the game machine 5 that is recorded in the application data and associated with the application service (step S626).

Subsequently, the highest score of all the players who played on the day is acquired from play histories managed in the application service server 4 (step S629).

Next, the application service server 4 determines whether an average score of the user exceeds the highest score of the day or not (step S632).

Subsequently, in a case where it is determined that the average score exceeds the highest score (step S632/Yes), on the basis of a corresponding determination condition received from the server 2, the application service server 4 generates predetermined response voice data such as "Why do not you take a punch? You can be the top today if you play as usual!", for example (step S635).

On the other hand, in a case where it is determined that the average score does not exceed the highest score (step S632/No), on the basis of a corresponding determination condition received from the server 2, the application service server 4 generates predetermined response voice data such as "Why do not you take a punch? Challenge the highest score today!", for example (step S638).

Figure 27:
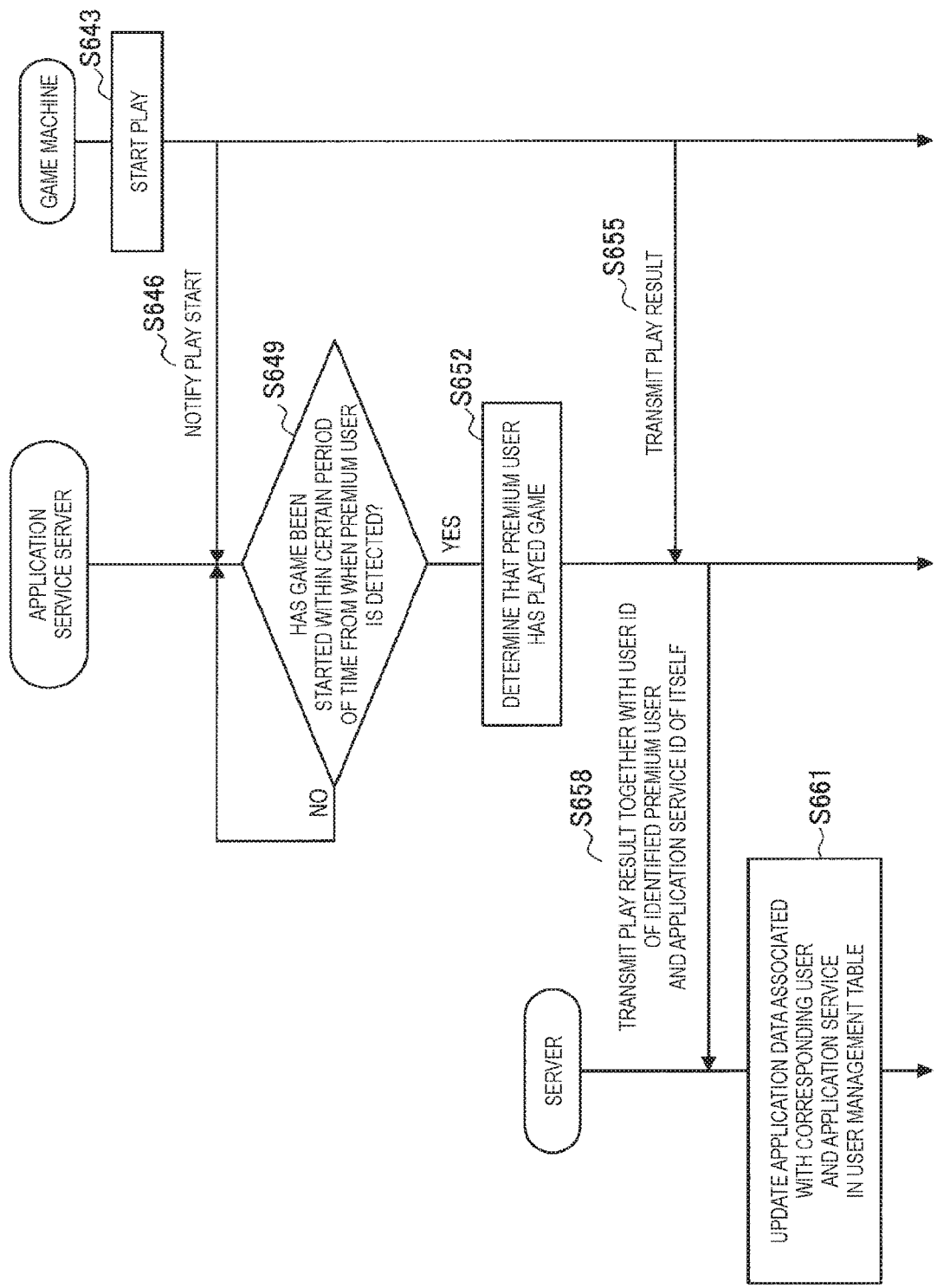
FIG. 27 is a sequence diagram illustrating a management process of a play history according to Application Example 1 of the third embodiment.

Hereinbefore, the generation process of response voice data according to Application Example 1 has been specifically described. As illustrated in steps S257 to S263 in FIG. 13, the response voice data generated by the application service server 4 is transmitted from the application service server 4 to the terminal device 1-3a via the server 2, and output as voice from the terminal device 1-3a Management Process of Play History Next, a management process of a play result of the game machine 5 will be described with reference to FIG. 27. FIG. 27 is a sequence diagram illustrating a management process of a play result of the game machine 5 according to Application Example 1.

As illustrated in FIG. 27, first of all, when the play of a game is started (step S643), the game machine 5 notifies the application service server 4 of a play start via a network (step S646).

Next, in a case where a game is started within a certain period of time from when a premium user is determined by the server 2, in accordance with the play start notification from the game machine 5 (step S649/Yes), the application service server 4 determines that the premium user is playing the game (step S652). Because a user ID of the premium user determined by the server 2 is also transmitted to the application service server 4 in step S251 in FIG. 13, the application service server 4 can recognize that the premium user has been determined in the server 2, and the user ID of the premium user.

Subsequently, when a play result of the game is transmitted from the game machine 5 (step S655), the application service server 4 transmits the received play result to the server 2 together with the user ID of the premium user and an application service ID of itself (step S658).

Then, the server 2 updates application data associated with a corresponding user and application service in the user management table (refer to FIG. 8) (step S661). In other words, the server 2 registers the play result in the game of the premium user into the user management table as application data.

Note that the application service server 4 can also receive a play result of a normal user determined to be not a premium user, from the game machine 5, and record the play result as a play history. Specifically, in a case where a play result is transmitted from the game machine 5 when determination of a premium user is not made, the application service server 4 accumulates the play result as a play result of an unspecified user (player). In addition, the application service server 4 transmits the play result of the unspecified user to the server 2 together with an application service ID of itself. The server 2 registers the received play result of the unspecified user in association with a corresponding application service in the application service management table (refer to FIG. 5), for example. Scores of players who played the game machine 5 on the day can be thereby recognized, for example.

As described above, in this application example, it becomes possible to generate, in cooperation with the game machine 5, response voice data with reference to a play history (e.g. scores) in the game machine 5.

4-3-2. Application Example 2

Figure 28:
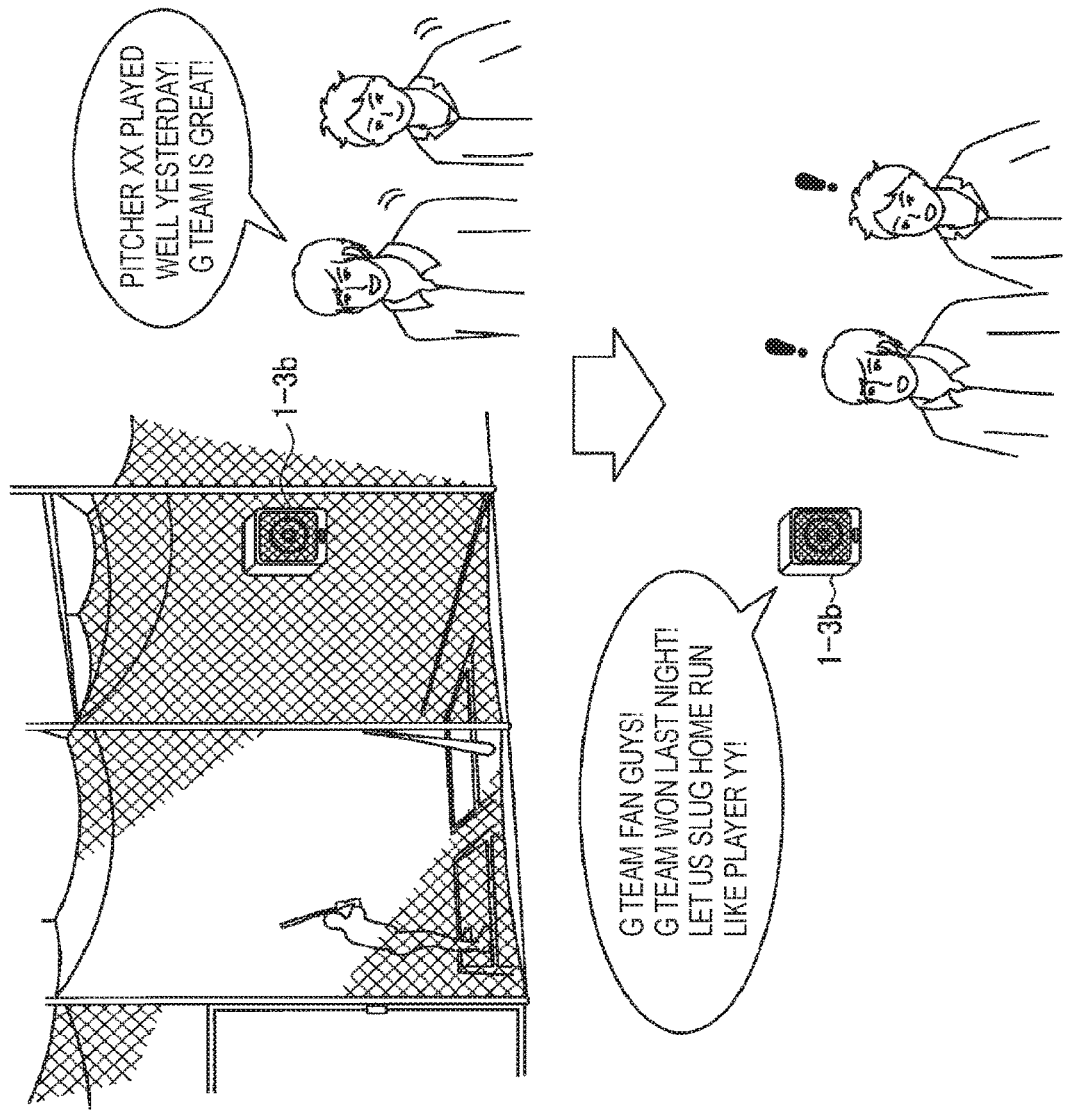
FIG. 28 is a diagram describing an overview of Application Example 2 of the third embodiment.

In addition, a location where the terminal device 1-3 is installed is not limited to the above-described example, and may be a batting cage, for example. FIG. 28 is a diagram describing an overview of Application Example 2.

As illustrated in an upper section in FIG. 28, for example, in a case where the terminal device 1-3b is installed in a batting cage, in a case where a male-adult user who frequently (e.g. three or more days in one week) visits the batting cage has pronounced a keyword regarding a baseball club of professional baseball, the user is determined to be a premium user. Then, in a case where the user is determined to be a premium user, as illustrated in a lower section in FIG. 28, response voice data recommending the use of the batting cage is output from the terminal device 1-3b.

At this time, in this application example, from a keyword pronounced by a user frequently visiting the batting cage (regular customer), a baseball club that the user follows (an example of user information (preference information)) is determined, and response voice data for a regular customer being a fan of a specific baseball club can be generated with reference to a latest winning or losing result, match content, and the like.

(Operation Process)

Subsequently, an operation process according to this application example will be described. Because a basic operation process according to the present embodiment is mainly similar to the operation process described with reference to FIGS. 12 and 13, here, a premium user determination process (step S239 illustrated in FIG. 13) and a response voice data generation process (step S254 illustrated in FIG. 13), which are processes specific to the present embodiment, will be sequentially described with reference to FIGS. 29 and 30.

Premium User Determination Process

Figure 29:
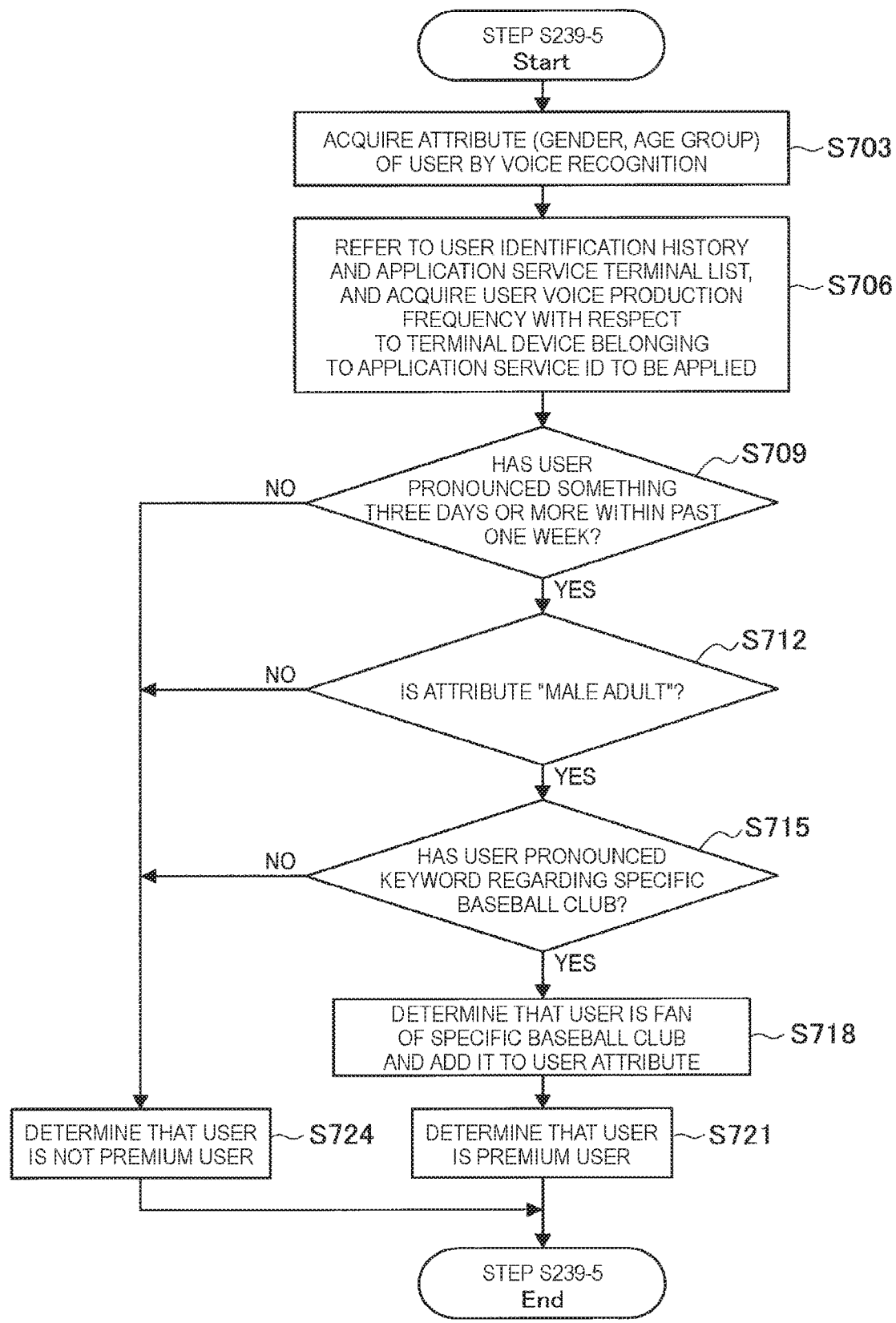
FIG. 29 is a flowchart illustrating a determination process of a premium user according to Application Example 2 of the third embodiment.

FIG. 29 is a flowchart illustrating a determination process of a premium user according to Application Example 2. As illustrated in FIG. 29, first of all, the server 2 estimates an attribute (gender, age group, etc.) of a user by voice recognition of speech voice information (step S703). Specifically, for example, the control unit 20 of the server 2 estimates gender and an age group (age) as a user attribute from a way of speaking, tone of voice, vocal sound, a pitch of voice, features of voice, a voiceprint, or the like of the user.

Subsequently, the premium user determination unit 20f of the server 2 refers to the user identification history (refer to FIG. 10) and the application service terminal list (refer to FIG. 7) that are stored in the storage unit 23, and acquires voice production frequency of a user with respect to a terminal device belonging to an application service ID to be applied (step S706). Specifically, for example, the premium user determination unit 20f extracts, from the application service terminal list, the terminal devices (e.g. a plurality of terminal devices installed in a batting cage) belonging to the same application service ID as an application service ID to be applied to the terminal device 1-3b. Subsequently, the premium user determination unit 20f checks against the user identification history, and acquires time and date on which the user has been identified by the terminal device 1-3b and a terminal device belonging to the same application service ID (i.e. speech of the user has been recognized by voiceprint analysis) (voice production frequency).

Next, in accordance with a premium user determination condition of the application service registered in the application service management table, the premium user determination unit 20f performs determination of a premium user (steps S709 to S715). Specifically, for example, the premium user determination unit 20f determines whether the user has pronounced something three days or more within the past one week or not (step S709), whether an attribute is a "male adult" or not (step S712), and whether the user has pronounced a predetermined keyword (such as a team name or a player name) regarding a specific baseball club or not (step S715).

Subsequently, in a case where the user satisfies all of the above-described conditions (step S709/Yes, step S712/Yes, step S715/Yes), the premium user determination unit 20f determines that the user is a fan of the specific baseball club, and adds the determination to a user attribute (step S718), and in addition, determines that the user is a premium user (step S721). Note that the user attribute is accumulated in the user management table (refer to FIG. 8) stored in the storage unit 23 of the server 2, for example.

On the other hand, in a case where the user does not satisfy at least any of the above-described conditions (step S709/No, step S712/No, or step S715/No), the premium user determination unit 20f determines that the user is not a premium user (step S724).

Hereinbefore, the premium user determination process according to Application Example 2 has been specifically described. In this application example, when a user has pronounced something a predetermined number of days or more within a predetermined period without specifically identifying a keyword (i.e. user estimated to have visited a shop a predetermined number of days or more within a predetermined period), has a predetermined attribute, and has further pronounced a specific keyword serving as a trigger, the user is determined to be a premium user.

Response Voice Data Generation Process

Figure 30:
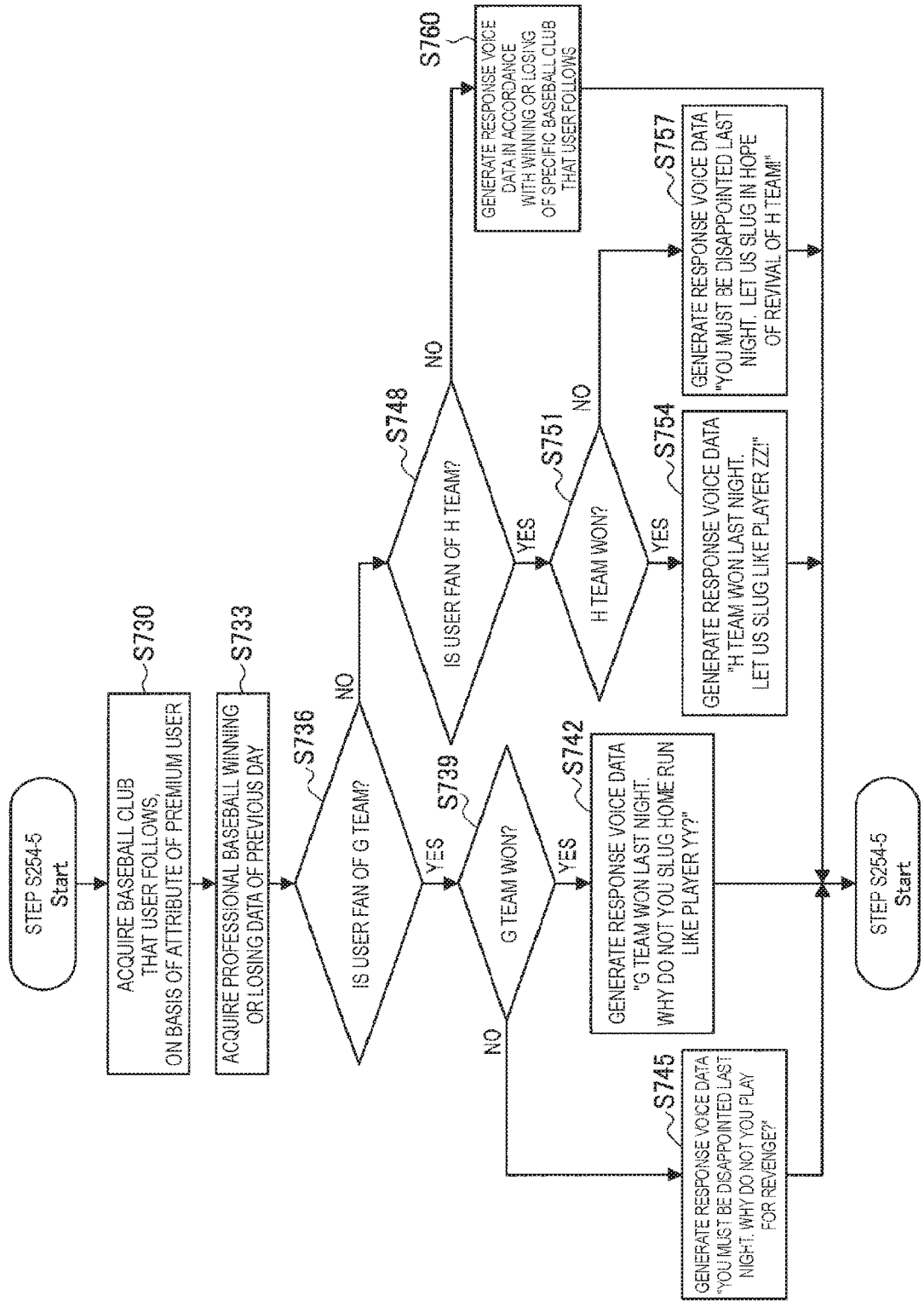
FIG. 30 is a flowchart illustrating a generation process of response voice data according to Application Example 2 of the third embodiment.

FIG. 30 is a flowchart illustrating a generation process of response voice data according to this application example. In this application example, response voice data is generated considering a baseball club (baseball team) that the user follows. A baseball club that each user follows is accumulated in the user management table (refer to FIG. 8) stored in the storage unit 23 of the server 2, for example, as an example of attribute information.

As illustrated in FIG. 30, first of all, the application service server 4 acquires a baseball club that the user follows, on the basis of an attribute of the premium user (step S730). Specifically, for example, the application service server 4 transmits a user ID of the premium user to the server 2, requests attribute information of the user, and acquires information indicating a baseball club that the user follows.

Next, the application service server 4 acquires professional baseball winning or losing data of the previous day from a predetermined server (not illustrated) on a network (step S733).

Subsequently, in a case where the user is a fan of a G team (an example of a baseball club) (step S736/Yes), the application service server 4 checks whether the G team has won or not, with reference to the professional baseball winning or losing data of the previous day (step S739).

Then, in a case where the G team has won (step S739/Yes), the application service server 4 generates response voice data such as "The G team won last night! Why do not you slug a home run like a player YY?", and "G team fan guys! Today, only valued customers can play at half price!", for example (step S742).

On the other hand, in a case where the G team has lost (step S739/No), the application service server 4 generates response voice data such as "You must be disappointed last night. Why do not you play for revenge?", for example (step S745).

In addition, in a case where the user is a fan of an H team (another example of a baseball club) (step S748/Yes), the application service server 4 checks whether the H team has won or not, with reference to the professional baseball winning or losing data of the previous day (step S751).

Then, in a case where the H team has won (step S751/Yes), the application service server 4 generates response voice data such as "The H team won last night! Let us slug like a player ZZ!", and "H team fan guys! Today, only valued customers can play at half price!", for example (step S754).

On the other hand, in a case where the G team has lost (step S751/No), the application service server 4 generates response voice data such as "You must be disappointed last night. Let us slug in hope of revival of the H team!", for example (step S757).

In addition, in a case where the user is a fan of another baseball club other than the G team and the H team (step S748/No), in a similar manner, response voice data is generated in accordance with winning or losing of a specific baseball club that the user follows (step S760).

Hereinbefore, the generation process of response voice data according to Application Example 2 has been specifically described. As illustrated in steps S257 to S263 in FIG. 13, the response voice data generated by the application service server 4 is transmitted from the application service server 4 to the terminal device 1-3b via the server 2, and output as voice from the terminal device 1-3b.

In this manner, in this application example, in a case where a premium user is a fan of a specific baseball club, it becomes possible to output, from the terminal device 1-3b provided in the batting cage, response voice data that mentions match content or the like of the baseball club and then recommends batting.

5. Conclusion

As described above, in an information processing system according to an embodiment of the present disclosure, it becomes possible to collect speech voice of a user, and recognize a specific user on the basis of the number of speeches performed by the user within a predetermined period.

In addition, because a user is identified by voice processing in the present embodiment, there is such an advantage that processing load is relatively small. In addition, users are less hesitant about the collection of voice as compared with imaging performed by a camera, and in addition, because a microphone has less directivity as compared with a camera, there is such an effect that surrounding voice information can be easily acquired. Nevertheless, the present embodiment is not limited only to voice processing, and in cases such as a case where it is difficult to determine a user only by voice processing such as voiceprint analysis, user determination may be performed while supplementarily using a camera in combination.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, a ROM, and a RAM incorporated in the terminal device 1 or the server 2 that have been described above, to implement a function of the terminal device 1 or the server 2 can also be created. In addition, a computer-readable storage medium storing the computer program is also provided.

In addition, in the above-described embodiments, determination of a positive user such as a regular customer is performed on the basis of speech voice, but the present embodiment is not limited to this, and determination of a negative user such as a suspicious person or an unfavorable customer can also be performed on the basis of speech voice using the system. In a case where a user is determined to be a negative user, the server 2 may generate response voice data for security measures and output the generated response voice data from the terminal device 1.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a communication unit capable of receiving voice information regarding voice collected by a plurality of microphones disposed discretely; and a control unit configured to determine a user identified on the basis of voice information regarding voice collected by a specific microphone among the plurality of microphones, the voice information having been received via the communication unit, to be a specific user that has performed speech a predefined number of times or more within at least a certain period of time, and control voice information to be transmitted to the specific user, to be transmitted to a speaker corresponding to the specific microphone, via the communication unit.

(2)

The information processing device according to (1), in which, when the control unit determines a user identified on the basis of voice information regarding voice collected by a specific microphone, to be a specific user defined for each application service, the control unit controls a speaker corresponding to the specific microphone to transmit voice information to be transmitted to the specific user, via the communication unit.

(3)

The information processing device according to (2), in which the control unit determines, in accordance with a keyword extracted as a result of recognizing voice information regarding voice collected by a specific microphone, and a keyword defined for each application service, a user identified on the basis of the voice information, to be a specific user defined for each application service.

(4)

The information processing device according to (2), in which the control unit determines, in accordance with an attribute of a user identified on the basis of voice information regarding voice collected by a specific microphone, the user identified on the basis of the voice information, to be a specific user defined for each application service.

(5)

The information processing device according to any one of (2) to (4), in which the control unit controls, in accordance with user information identified on the basis of voice information regarding voice collected by a specific microphone, a speaker corresponding to the specific microphone to transmit voice information corresponding to the user information, via the communication unit.

(6)

The information processing device according to (5), in which the user information is a user attribute, a play history of a game machine that operates in conjunction, or preference information of a user.

(7)

The information processing device according to any one of (1) to (6), in which the control unit performs identification of a user by analyzing a voiceprint of the collected voice.

(8)

The information processing device according to any one of (2) to (7), in which the control unit performs determination of the specific user using a determination condition defined in an application service to be applied to a speaker corresponding to the specific microphone that has collected the voice.

(9)

An information processing method including:

by a processor, determining a user identified on the basis of voice information regarding voice collected by a specific microphone among a plurality of microphones disposed discretely, the voice information having been received via a communication unit capable of receiving voice information regarding voice collected by the plurality of microphones, to be a specific user that has performed speech a predefined number of times or more within at least a certain period of time; and controlling voice information to be transmitted to the specific user, to be transmitted to a speaker corresponding to the specific microphone, via the communication unit.

REFERENCE SIGNS LIST 1 terminal device
2 server
3 network
4 application service server
5 game machine
10 control unit
11 communication unit
12 voice input unit
13 voice output unit
14 storage unit
20 control unit
20a application service management unit
20b user information management unit
20c voiceprint analysis unit
20d voice recognition unit
20e user identification unit
20f premium user determination unit
20g response voice data acquisition unit
21 network communication unit
22 application service server I/F
23 storage unit

The invention claimed is:

1. An information processing device comprising:
processing circuitry configured to
receive voice information regarding a voice of a customer collected by a specific microphone of a plurality of microphones at a location,
identify the customer on a basis of the received voice information,
determine whether the customer identified on the basis of the voice information regarding the voice of the customer collected by the specific microphone among the plurality of microphones to be a specific type of customer based on speech of the customer being captured a predefined number of times or more within at least a certain period of time via one or more of the plurality of microphones, the predefined number of times indicating a condition for the customer to be determined as the specific type of customer at the location, and
control a message to be output to the customer via a speaker corresponding to the specific microphone based on the customer being determined to be the specific type of customer.

2. The information processing device according to claim 1, wherein, when the processing circuitry determines the customer identified on the basis of the voice information regarding the voice of the customer collected by the specific microphone, to be the specific type of customer defined for an application service,
the processing circuitry is configured to control the speaker corresponding to the specific microphone to output the message to the customer.

3. The information processing device according to claim 2, wherein the processing circuitry is configured to determine, in accordance with a keyword extracted as a result of recognizing the voice information regarding the voice of the customer collected by the specific microphone, and a keyword defined for the application service, the customer identified on the basis of the voice information, to be the specific type of customer defined for the application service.

4. The information processing device according to claim 2, wherein the processing circuitry is configured to determine, in accordance with an attribute of the customer identified on the basis of the voice information regarding the voice of the customer collected by the specific microphone, the customer identified on the basis of the voice information, to be the specific type of customer defined for the application service.

5. The information processing device according to claim 2, wherein the processing circuitry is configured to control, in accordance with customer information identified on the basis of the voice information regarding the voice of the customer collected by the specific microphone, the speaker corresponding to the specific microphone to output the message corresponding to the customer information.

6. The information processing device according to claim 5, wherein the customer information is a customer attribute, a play history of a game machine that operates in conjunction, or preference information of the customer.

7. The information processing device according to claim 1, wherein the processing circuitry is configured to identify the customer by analyzing a voiceprint of the collected voice.

8. The information processing device according to claim 2, wherein the processing circuitry is configured to determine the specific type of customer using a determination condition defined in the application service.

9. An information processing method comprising:
receiving voice information regarding a voice of a customer collected by a specific microphone of a plurality of microphones at a location;
identifying the customer on a basis of the received voice information;
determining, by processing circuitry, whether the customer identified on the basis of the voice information regarding the voice of the customer collected by the specific microphone among the plurality of microphones to be a specific type of customer based on speech of the customer being captured a predefined number of times or more within at least a certain period of time via one or more of the plurality of microphones, the predefined number of times indicating a condition for the customer to be determined as the specific type of customer at the location; and
controlling a message to be output to the customer via a speaker corresponding to the specific microphone based on the customer being determined to be the specific type of customer.

10. The information processing device according to claim 1, wherein the specific type of customer is one of a plurality of customer types with different priorities.

11. The information processing method according to claim 9, wherein the controlling comprises:
controlling the speaker corresponding to the specific microphone to output the message to the customer when the customer identified on the basis of the voice information regarding the voice of the customer collected by the specific microphone is determined to be the specific type of customer defined for an application service.

12. The information processing method according to claim 11, wherein the determining comprises:
determining, in accordance with a keyword extracted as a result of recognizing the voice information regarding the voice of the customer collected by the specific microphone, and a keyword defined for the application service, the customer identified on the basis of the voice information, to be the specific type of customer defined for the application service.

13. The information processing method according to claim 11, wherein the determining comprises:
   determining, in accordance with an attribute of the customer identified on the basis of the voice information regarding the voice of the customer collected by the specific microphone, the customer identified on the basis of the voice information, to be the specific type of customer defined for the application service.

14. The information processing method according to claim 11, wherein the controlling comprises:
   controlling, in accordance with customer information identified on the basis of the voice information regarding the voice of the customer collected by the specific microphone, the speaker corresponding to the specific microphone to output the message corresponding to the customer information.

15. The information processing method according to claim 14, wherein the customer information is a customer attribute, a play history of a game machine that operates in conjunction, or preference information of the customer.

16. The information processing method according to claim 9, wherein the identifying comprises:
   identifying the customer by analyzing a voiceprint of the collected voice.

17. The information processing method according to claim 11, wherein the determining comprises:
   determining the specific type of customer using a determination condition defined in the application service.

18. A non-transitory computer-readable storage medium storing instructions which when executed by a computer cause the computer to perform an information processing method, the information processing method comprising:
   receiving voice information regarding a voice of a customer collected by a specific microphone of a plurality of microphones at a location;
   identifying the customer on a basis of the received voice information;
   determining whether the customer identified on the basis of the voice information regarding the voice of the customer collected by the specific microphone among the plurality of microphones to be a specific type of customer based on speech of the customer being captured a predefined number of times or more within at least a certain period of time via one or more of the plurality of microphones, the predefined number of times indicating a condition for the customer to be determined as the specific type of customer at the location; and
   controlling a message to be output to the customer via a speaker corresponding to the specific microphone based on the customer being determined to be the specific type of customer.

19. The information processing device according to claim 1, wherein the processing circuitry is configured to determine the customer identified on the basis of the voice information to be the specific type of customer (i) based on the customer having performed speech the predefined number of times or more within at least a certain period of time and (ii) irrespective of a target to which the voice of the customer is directed.

20. The information processing device according to claim 1, wherein
   the location is a retail location, and
   the plurality of microphones collects the voice information at different locations at the retail location.

* * * * *